(12) United States Patent
Gattani et al.

(10) Patent No.: US 11,208,934 B2
(45) Date of Patent: Dec. 28, 2021

(54) SYSTEMS AND METHODS FOR MIXING EXHAUST GAS AND REDUCTANT

(71) Applicant: CUMMINS EMISSION SOLUTIONS INC., Columbus, IN (US)

(72) Inventors: Akshat Gattani, Columbus, IN (US); Nitin Tripathi, Pune (IN)

(73) Assignee: CUMMINS EMISSION SOLUTIONS INC., Columbus, IN (US)

( * ) Notice: Subject to any disclaimer, the term of this patent is extended or adjusted under 35 U.S.C. 154(b) by 0 days.

(21) Appl. No.: 16/796,016

(22) Filed: Feb. 20, 2020

(65) Prior Publication Data

US 2020/0271035 A1    Aug. 27, 2020

(30) Foreign Application Priority Data

Feb. 25, 2019    (IN) .............................. 201941007211

(51) Int. Cl.
*F01N 3/28* (2006.01)
*F01N 3/20* (2006.01)
(Continued)

(52) U.S. Cl.
CPC ....... *F01N 3/2892* (2013.01); *B01D 53/9418* (2013.01); *B01F 3/0446* (2013.01);
(Continued)

(58) Field of Classification Search
CPC combination set(s) only.
See application file for complete search history.

(56) References Cited

U.S. PATENT DOCUMENTS

| 6,668,973 | B2 | 12/2003 | Grandmougin et al. |
| 6,852,666 | B1 | 2/2005 | Bouly et al. |

(Continued)

FOREIGN PATENT DOCUMENTS

| CN | 102459835 A | 5/2012 |
| CN | 104685177 A | 6/2015 |

(Continued)

OTHER PUBLICATIONS

Alano, et al., "Compact SCR for Passenger Cars," SAE Technical Paper 2011-01-1318, 9 pages (2011).

(Continued)

*Primary Examiner* — Binh Q Tran
(74) *Attorney, Agent, or Firm* — Foley & Lardner LLP

(57) ABSTRACT

A mixing assembly for an exhaust aftertreatment system includes a mixing body, an upstream plate, a downstream plate, and a swirl plate. The mixing body includes an upstream mixing body opening and a downstream mixing body opening. The upstream mixing body opening is configured to receive exhaust gas. The upstream plate is coupled to the mixing body. The upstream plate includes a plurality of upstream plate openings. Each of the plurality of upstream plate openings is configured to receive a flow percentage that is less than 50% of the total flow of the exhaust gas. The downstream plate is coupled to the mixing body downstream from the upstream plate in a direction of exhaust gas flow. The downstream plate includes a downstream plate opening. The swirl plate is positioned between the upstream plate and the downstream plate and defines a swirl collection region and a swirl concentration region.

25 Claims, 12 Drawing Sheets

(51) Int. Cl.
  *B01F 5/06* (2006.01)
  *B01F 5/04* (2006.01)
  *B01D 53/94* (2006.01)
  *B01F 3/04* (2006.01)

(52) U.S. Cl.
  CPC .............. *B01F 5/04* (2013.01); *B01F 5/0604* (2013.01); *F01N 3/2066* (2013.01); *F01N 2610/02* (2013.01); *F01N 2610/1406* (2013.01); *F01N 2610/1433* (2013.01); *F01N 2610/1453* (2013.01)

(56) References Cited

U.S. PATENT DOCUMENTS

| | | | |
|---|---|---|---|
| 7,240,769 B2 | 7/2007 | Nezan et al. | |
| 7,470,301 B2 | 12/2008 | Heydens | |
| 7,476,082 B2 | 1/2009 | Vogiatzis et al. | |
| 7,571,880 B2 | 8/2009 | Perez | |
| 7,581,389 B2 | 9/2009 | Crawley et al. | |
| 7,685,811 B2 | 3/2010 | Taylor et al. | |
| 7,711,124 B2 | 5/2010 | Garabedian | |
| 7,712,305 B2 | 5/2010 | Kapsos et al. | |
| 7,748,404 B2 | 7/2010 | Abram et al. | |
| 7,793,490 B2 | 9/2010 | Amon et al. | |
| 7,836,692 B2 | 11/2010 | Leroy | |
| 7,930,884 B2 | 4/2011 | Leroy et al. | |
| 7,976,788 B2 | 7/2011 | Drost et al. | |
| 7,992,301 B2 | 8/2011 | Lecoester et al. | |
| 7,992,677 B2 | 8/2011 | Kadandale | |
| 8,011,471 B2 | 9/2011 | Zheng | |
| 8,033,101 B2 | 10/2011 | Amon et al. | |
| 8,092,746 B2 | 1/2012 | Salasc et al. | |
| 8,162,103 B2 | 4/2012 | Barrieu et al. | |
| 8,201,401 B2 | 6/2012 | Abram et al. | |
| 8,245,506 B2 | 8/2012 | Leroy | |
| 8,261,778 B2 | 9/2012 | Leroy et al. | |
| 8,263,010 B2 | 9/2012 | Brunel | |
| 8,402,756 B2 | 3/2013 | Luce et al. | |
| 8,413,428 B2 | 4/2013 | Devismes | |
| 8,438,838 B2 | 5/2013 | Khadiya | |
| 8,439,156 B1 | 5/2013 | Abram | |
| 8,453,672 B2 | 6/2013 | Abram et al. | |
| 8,485,314 B2 | 7/2013 | Danner et al. | |
| 8,572,846 B2 | 11/2013 | Robinson | |
| 8,578,706 B2 | 11/2013 | Perrot et al. | |
| 8,584,449 B2 | 11/2013 | Willeke et al. | |
| 8,590,152 B2 | 11/2013 | Cantele et al. | |
| 8,607,555 B2 | 12/2013 | Kaiser et al. | |
| 8,635,858 B2 | 1/2014 | Levin et al. | |
| 8,646,564 B2 | 2/2014 | Khadiya et al. | |
| 8,661,672 B2 | 3/2014 | Cantele et al. | |
| 8,661,792 B2 | 3/2014 | Greber et al. | |
| 8,661,798 B2 | 3/2014 | Prather | |
| 8,683,789 B2 | 4/2014 | Willats et al. | |
| 8,776,508 B2 | 7/2014 | Abram et al. | |
| 8,800,263 B2 | 8/2014 | Eder et al. | |
| 8,800,713 B2 | 8/2014 | Keesser et al. | |
| 8,815,197 B2 | 8/2014 | Broderick et al. | |
| 8,857,056 B2 | 10/2014 | Keller et al. | |
| 8,857,561 B2 | 10/2014 | Abram et al. | |
| 8,881,718 B2 | 11/2014 | Parrish et al. | |
| 8,881,863 B2 | 11/2014 | Abram et al. | |
| 8,938,951 B2 | 1/2015 | Bartolo et al. | |
| 8,955,641 B2 | 2/2015 | Abram et al. | |
| 8,997,352 B2 | 4/2015 | Troeger et al. | |
| 9,027,592 B2 | 5/2015 | Gafforelli et al. | |
| 9,058,041 B2 | 6/2015 | Lacouture et al. | |
| 9,068,488 B2 | 6/2015 | Klement | |
| 9,103,253 B2 | 8/2015 | Birkby et al. | |
| 9,108,857 B2 | 8/2015 | Pigeon et al. | |
| 9,121,315 B2 | 9/2015 | Abram et al. | |
| 9,121,329 B2 | 9/2015 | Bogard et al. | |
| 9,133,744 B2 | 9/2015 | Birkby et al. | |
| 9,145,810 B2 | 9/2015 | Bisaiji et al. | |
| 9,194,271 B2 | 11/2015 | Willats | |
| 9,248,404 B2 | 2/2016 | Brunel et al. | |
| 9,266,075 B2 | 2/2016 | Chapman et al. | |
| 9,267,417 B2 | 2/2016 | Baldwin et al. | |
| 9,279,357 B2 | 3/2016 | Saint-Dizier | |
| 9,346,017 B2 | 5/2016 | Greber | |
| 9,376,947 B2 | 6/2016 | Abram et al. | |
| 9,388,724 B2 | 7/2016 | Noller et al. | |
| 9,464,546 B2 | 10/2016 | Perrot et al. | |
| 9,481,055 B2 | 11/2016 | Greber | |
| 9,506,385 B2 | 11/2016 | Khadiya et al. | |
| 9,506,386 B2 | 11/2016 | Brunel | |
| 9,518,488 B2 | 12/2016 | Pigeon | |
| 9,534,723 B2 | 1/2017 | Steck | |
| 9,567,884 B2 | 2/2017 | Greber | |
| 9,581,067 B2 | 2/2017 | Guilbaud et al. | |
| 9,617,890 B2 | 4/2017 | Rusch et al. | |
| 9,624,802 B2 | 4/2017 | Greber | |
| 9,644,522 B2 | 5/2017 | Gudorf et al. | |
| 9,657,624 B2 | 5/2017 | Rusch et al. | |
| 9,657,652 B2 | 5/2017 | Hossfeld et al. | |
| 9,664,081 B2 | 5/2017 | Rusch et al. | |
| 9,714,598 B2 | 7/2017 | Alano et al. | |
| 9,726,064 B2 | 8/2017 | Alano | |
| 9,737,907 B2 | 8/2017 | Hornback et al. | |
| 9,737,908 B2 | 8/2017 | Hornback et al. | |
| 9,745,883 B2 | 8/2017 | Quadri et al. | |
| 9,789,995 B2 | 10/2017 | Saint-Dizier | |
| 9,816,428 B2 | 11/2017 | Callahan | |
| 9,828,897 B2 | 11/2017 | Alano | |
| 9,849,424 B2 * | 12/2017 | Davidson | .............. F01N 3/2066 |
| 9,869,230 B2 | 1/2018 | Hornback | |
| 9,896,985 B2 | 2/2018 | Khadiya | |
| 9,970,340 B2 | 5/2018 | Abram et al. | |
| 9,984,670 B2 | 5/2018 | Zintel et al. | |
| 9,990,913 B2 | 6/2018 | Zintel et al. | |
| 9,991,435 B2 | 6/2018 | Khuc | |
| 9,995,193 B2 | 6/2018 | Alano et al. | |
| 10,030,564 B2 | 7/2018 | Cossard et al. | |
| 10,047,650 B2 | 8/2018 | Abram | |
| 10,047,657 B2 | 8/2018 | Noren et al. | |
| 10,060,360 B2 | 8/2018 | Delplanque et al. | |
| 10,138,789 B1 * | 11/2018 | Mishra | ................ B01F 3/04049 |
| 10,138,795 B2 | 11/2018 | Hornback | |
| 10,167,785 B2 | 1/2019 | Oblinger et al. | |
| 10,190,465 B2 | 1/2019 | Alano et al. | |
| 10,215,075 B2 | 2/2019 | Chapman et al. | |
| 10,233,810 B2 | 3/2019 | Guinehut et al. | |
| 10,233,814 B2 | 3/2019 | Wasif et al. | |
| 10,284,944 B1 | 5/2019 | Steinkilberg | |
| 10,287,948 B1 | 5/2019 | Moulieres et al. | |
| 10,287,954 B2 | 5/2019 | Chapman et al. | |
| 10,294,843 B2 | 5/2019 | Alano et al. | |
| 10,309,279 B2 | 6/2019 | Bartolo | |
| 10,309,284 B2 | 6/2019 | Crawley et al. | |
| 10,316,721 B1 | 6/2019 | Moulieres et al. | |
| 10,337,379 B2 | 7/2019 | Dimpelfeld et al. | |
| 10,337,380 B2 | 7/2019 | Willats et al. | |
| 10,337,382 B2 | 7/2019 | Godard et al. | |
| 10,352,484 B2 | 7/2019 | Blueml et al. | |
| 10,358,956 B1 | 7/2019 | Egan et al. | |
| 10,443,477 B2 * | 10/2019 | Sampath | ............... F01N 3/2066 |
| 10,907,524 B2 * | 2/2021 | Levin | ..................... F01N 13/08 |
| 2004/0109795 A1 | 6/2004 | Marc | |
| 2008/0256931 A1 | 10/2008 | Kawakita et al. | |
| 2010/0083643 A1 | 4/2010 | Hayashi et al. | |
| 2012/0216513 A1 | 8/2012 | Greber et al. | |
| 2014/0020785 A1 | 1/2014 | Blueml | |
| 2014/0033686 A1 * | 2/2014 | Fischer | ................... F01N 13/08 |
| | | | 60/286 |
| 2015/0360176 A1 * | 12/2015 | Bui | ..................... B01F 3/04049 |
| | | | 423/212 |
| 2016/0319724 A1 * | 11/2016 | Alano | ................... B01F 5/0614 |
| 2016/0341098 A1 | 11/2016 | Lerdung et al. | |
| 2017/0089246 A1 | 3/2017 | Greber et al. | |
| 2017/0303022 A1 | 10/2017 | Steinkilberg et al. | |
| 2018/0156088 A1 | 6/2018 | Vurpillot et al. | |
| 2018/0163602 A1 | 6/2018 | Greber et al. | |
| 2018/0169728 A1 | 6/2018 | Wolf et al. | |
| 2018/0216516 A1 | 8/2018 | Blueml | |

(56) References Cited

U.S. PATENT DOCUMENTS

| | | |
|---|---|---|
| 2018/0264574 A1 | 9/2018 | Blueml |
| 2018/0291786 A1 | 10/2018 | Bartolo |
| 2018/0291790 A1 | 10/2018 | Bartolo |
| 2018/0306092 A1 | 10/2018 | Lecoester et al. |
| 2018/0313248 A1 | 11/2018 | Blueml |
| 2018/0355778 A1 | 12/2018 | Callahan |
| 2019/0055876 A1 | 2/2019 | Willats et al. |
| 2019/0072021 A1 | 3/2019 | Steinkilberg et al. |
| 2019/0072022 A1 | 3/2019 | Willats et al. |
| 2019/0085749 A1 | 3/2019 | Willats et al. |
| 2019/0093528 A1 | 3/2019 | Egan et al. |
| 2019/0101041 A1 | 4/2019 | Willats et al. |
| 2019/0120111 A1 | 4/2019 | Greber |
| 2019/0170034 A1 | 6/2019 | Godard et al. |
| 2019/0170092 A1 | 6/2019 | Oblinger et al. |
| 2019/0195116 A1 | 6/2019 | Kienle |
| 2019/0218955 A1 | 7/2019 | Egan et al. |
| 2019/0234266 A1 | 8/2019 | Bartolo et al. |

FOREIGN PATENT DOCUMENTS

| | | |
|---|---|---|
| CN | 106014560 A | 10/2016 |
| CN | 206144632 A | 5/2017 |
| CN | 206144633 A | 5/2017 |
| CN | 107530652 A | 1/2018 |
| DE | 10 2008 043 726 A1 | 5/2009 |
| DE | 11 2012 006 957 T5 | 6/2015 |
| JP | 2014-238095 A | 12/2014 |
| KR | 101723758 B1 | 4/2017 |
| WO | WO-2012/052672 A1 | 4/2012 |
| WO | WO-2012/080585 A1 | 6/2012 |
| WO | WO-2014/051617 A1 | 4/2014 |

OTHER PUBLICATIONS

Baretzky, "The Development of the Audi 3.6-litre V8 Twin Turbo FSI Engine for Le Mans," AutoTechnology 2(3), pp. 54-58 (2002).
Bedick, et al., "Demonstration and evaluation of a retrofit urea-SCR after-treatment system for NOx reduction in marine diesels," Journal of Marine Engineering & Technology 10(1), pp. 3-13 (2011).
Guthenke, et al., "Simulation of NOx Storage and Reduction Catalyst: Model Development and Application," SAE Technical Paper 2007-01-1117, 10 pages (2007).
Kakuhou, et al., "Characteristics of Mixture Formation in a Direct Injection SI Engine with Optimized In-Cylinder Swirl Air Motion," SAE Technical Paper 1999-01-0505, 11 pages (1999).
Kowatari, et al., "A Study of a New Aftertreatment System (1): A New Dosing Device for Enhancing Low Temperature Performance of Urea-SCR," SAE Technical Paper 2006-01-0642, 9 pages (2006).
Miyajima, et al., "Experimental Characterization of Flat-Spray Injector in Gasoline Direct Injection Engines," SAE Technical Paper 2003-01-0061, 16 pages (2003).
Ponticel, "Coast-to-coast diesel," Automotive Engineering International, 3 pages (2009).
Rhim & Farrell, "Characteristics of Air Flow Surrounding Non-Evaporating Transient Diesel Sprays," SAE Technical Paper 2000-01-2789, 17 pages (2000).
Seo, "Aftertreatment Package Design for SCR Performance Optimization," SAE Technical Paper 2011-01-1135, 7 pages (2011).
Shi & Reitz, "Optimization study of the effects of bowl geometry, spray targeting, and swirl ratio for a heavy-duty diesel engine operated at low and high load," International Journal of Engine Research 9(4), pp. 325-346 (2008).
Sjoberg, "Rotating Injector for DI Diesel Engines: Analysis of the Combustion System with Regards to Swirl, Fuel, Boost and Fuel/Air-Equivalence Ratio," SAE Transactions 109, Section 3: Journal of Engines, pp. 57-70 (2000).
Terazawa, et al., "Mazda's New Common Rail DI Diesel Engine," AutoTechnology 3(3), pp. 48-51 (2003).
Walker, et al., "The Development and Performance of the Compact SCR-Trap System: A 4-Way Diesel Emission Control System," SAE Transactions 112, Section 3: Journal of Engines, pp. 1198-1206 (2003).
Yang, et al., "Improvement of Three-Dimensional Diesel Spray Modeling in Near Region with Coarse Mesh," SAE Transactions 109, Section 3: Journal of Engines, pp. 326-335 (2000).
Zhang & Romzek, "3-D Numerical Study of Flow Mixing in Front of SCR for Different Injection Systems," Diesel Exhaust Emission Control 2007, SP-2080, pp. 489-498 (2007).
First Office Action issued for Indian Patent Application No. 201941007211, dated Jun. 29, 2021, 6 pages.
First Office Action in Chinese Patent Application No. 2020101170166, dated Oct. 9, 2021, 8 pages.

\* cited by examiner

SYSTEMS AND METHODS FOR MIXING EXHAUST GAS AND REDUCTANT

CROSS-REFERENCE TO RELATED PATENT APPLICATION

This application claims priority to Indian Provisional Patent Application No. 201941007211, filed Feb. 25, 2019, the entire disclosure of which is incorporated herein by reference.

TECHNICAL FIELD

The present application relates generally to systems and methods for mixing exhaust gas and reductant in an exhaust aftertreatment system of an internal combustion engine.

BACKGROUND

For internal combustion engines, such as diesel engines, nitrogen oxide ($NO_x$) compounds may be emitted in exhaust. It may be desirable to reduce $NO_x$ emissions to, for example, comply with environmental regulations. To reduce $NO_x$ emissions, a reductant may be dosed into the exhaust by a dosing system and within an aftertreatment system. The reductant facilitates conversion of a portion of the exhaust into non-$NO_x$ emissions, such as nitrogen ($N_2$), carbon dioxide ($CO_2$), and water ($H_2O$), thereby reducing $NO_x$ emissions.

In some applications, it may be desirable to facilitate mixing of the reductant in the exhaust. Through this mixing, the reductant may be more uniformly distributed within the exhaust, thereby enabling more of the exhaust to be converted into non-$NO_x$ emissions. Additionally, this mixing may mitigate accumulation of reductant deposits on components of the aftertreatment system.

Mixing of reductant and exhaust may be accomplished through the use of a variety of mechanisms. One of these mechanisms is a plate which includes a plurality of openings. The plate is positioned upstream of the doser and the openings are positioned such that the exhaust is caused to swirl as a result of passing through the openings. This swirl enhances mixing of the reductant and the exhaust downstream of the plate. The position of each opening and an amount of the exhaust that each opening receives is related to the characteristics of the swirl that is produced by the plate.

SUMMARY

In one embodiment, a mixing assembly for an exhaust aftertreatment system includes a mixing body, an upstream plate, a downstream plate, and a swirl plate. The mixing body includes an upstream mixing body opening and a downstream mixing body opening. The upstream mixing body opening is configured to receive exhaust gas. The upstream plate is coupled to the mixing body. The upstream plate includes a plurality of upstream plate openings. Each of the plurality of upstream plate openings is configured to receive a flow percentage that is less than 50% of a total flow of the exhaust gas. The downstream plate is coupled to the mixing body downstream from the upstream plate in a direction of exhaust gas flow. The downstream plate includes a downstream plate opening. The swirl plate is positioned between the upstream plate and the downstream plate and defines a swirl collection region and a swirl concentration region that is contiguous with the swirl collection region. The swirl collection region is positioned over the plurality of upstream plate openings and the swirl collection region is positioned over the downstream plate opening.

In another embodiment, a mixing assembly includes a mixing body, an upstream plate, and an injector mount. The mixing body includes an upstream mixing body opening and a downstream mixing body opening. The upstream mixing body opening is configured to receive exhaust gas. The upstream plate is coupled to the mixing body. The upstream plate includes a first upstream plate opening a second upstream plate opening. The first upstream plate opening is configured to receive a first flow percentage that is between 20% and 40%, inclusive of a total flow of the exhaust gas. The second upstream plate opening is configured to receive a second flow percentage that is between 20% and 40% inclusive of the total flow of the exhaust gas. The injector mount is coupled to the mixing body and configured to be coupled to an injector. The injector mount is defined by an injector center axis that extends between the first upstream plate opening and the second upstream plate opening.

In yet another embodiment, a mixing assembly includes a mixing body, an upstream plate, and a swirl plate. The mixing body includes an upstream mixing body opening and a downstream mixing body opening. The upstream mixing body opening is configured to receive exhaust gas. The upstream plate is coupled to the mixing body. The upstream plate includes a first upstream plate opening and a second upstream plate opening. The first upstream plate opening is configured to receive a first flow percentage that is between 20% and 40%, inclusive of a total flow of the exhaust gas. The second upstream plate opening is configured to receive a second flow percentage that is between 20% and 40% inclusive of the total flow of the exhaust gas. The swirl plate is coupled to the upstream plate and defines a swirl collection region and a swirl concentration region that is contiguous with the swirl collection region. The swirl collection region extends across the first upstream plate opening and the second upstream plate opening. The swirl collection region is separated from the first upstream plate opening and second upstream plate opening by the swirl plate.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1:
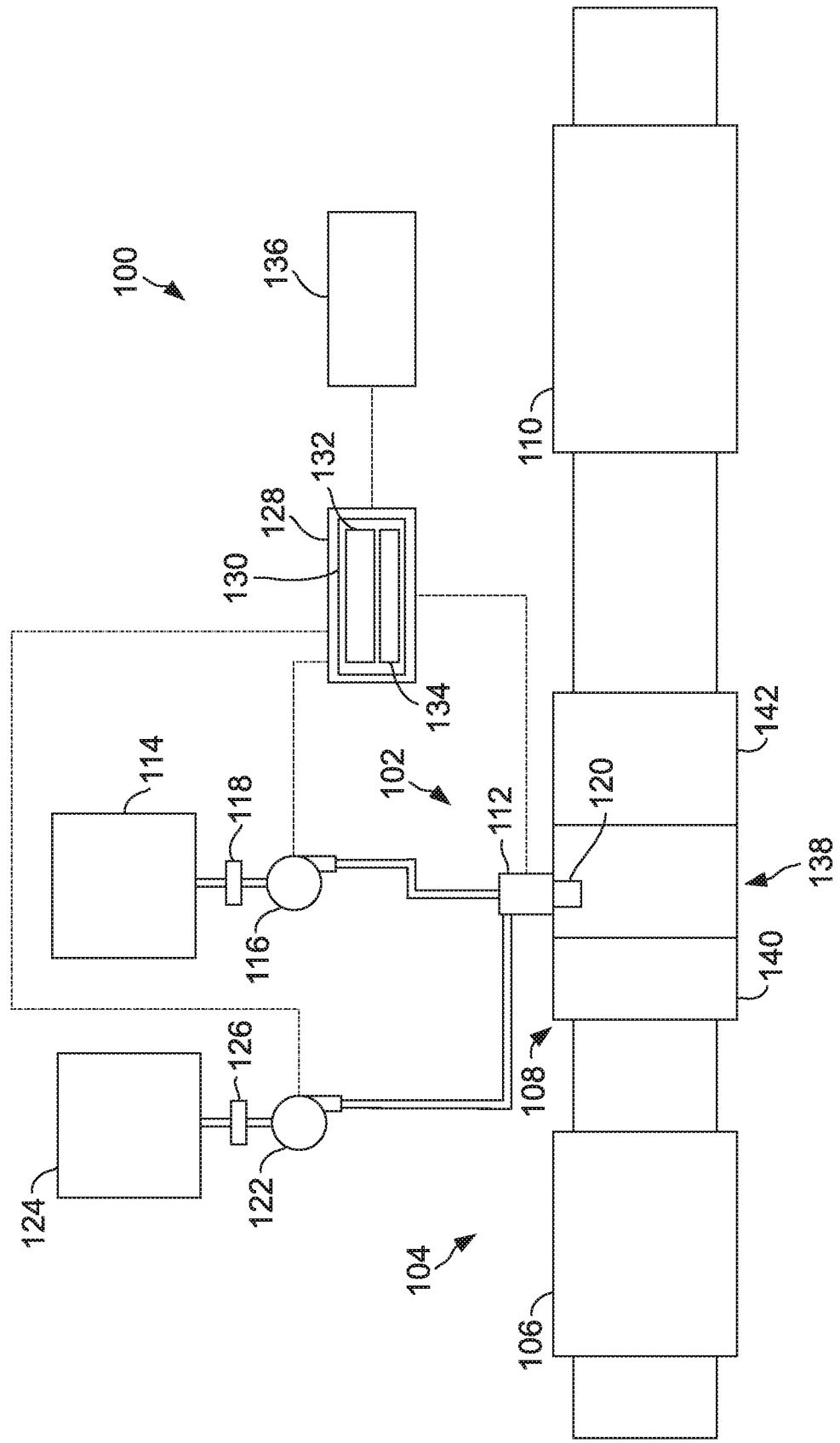
FIG. 1 is a block schematic diagram of an example exhaust aftertreatment system.
Figure 2:
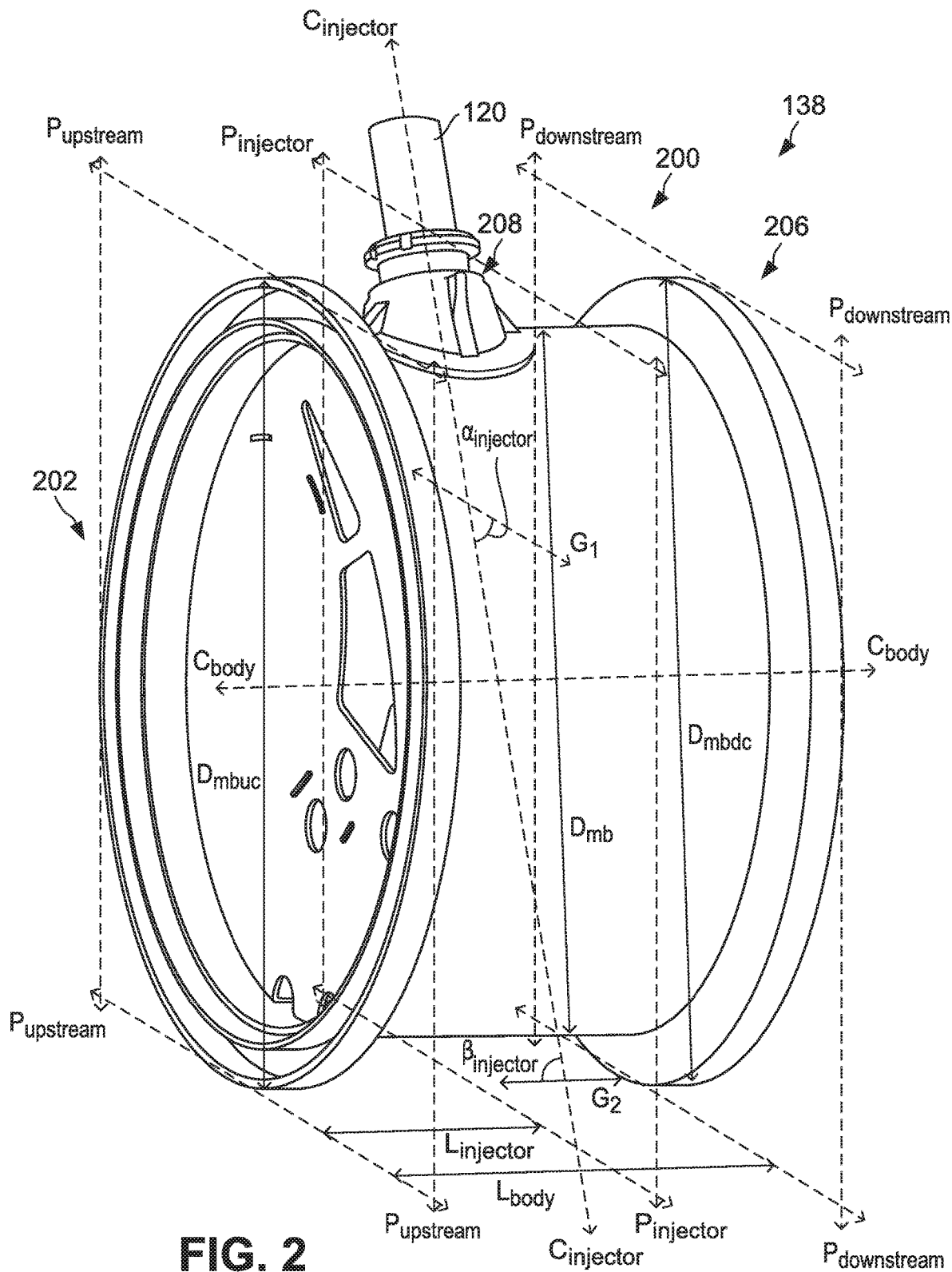
FIG. 2 is a perspective view of a mixing assembly for an exhaust aftertreatment system.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for mixing exhaust gas and reductant in an exhaust aftertreatment system of an internal combustion engine. The various concepts introduced above and discussed in greater detail below may be implemented in any of numerous ways, as the described concepts are not limited to any particular manner of implementation. Examples of specific implementations and applications are provided primarily for illustrative purposes.

I. Overview

Internal combustion engines (e.g., diesel internal combustion engines, etc.) produce exhaust gas that is often treated by a dosing module within an exhaust aftertreatment system. A dosing module typically treats exhaust gas using a reductant. The reductant is adsorbed by a catalyst. The adsorbed reductant in the catalyst functions to reduce $NO_x$ in the exhaust gas.

In order to effectively treat the exhaust gas using the reductant, the reductant must be dispersed within the exhaust gas. Additionally, if the reductant is not dispersed within the exhaust gas, deposits of the reductant may form. These deposits may accumulate over time and require that the exhaust aftertreatment system be cleaned or serviced. Cleaning of the exhaust aftertreatment system can sometimes be accomplished through a regeneration cycle where the temperature of the exhaust gas is increased. However, such regeneration cycles increase fuel consumption and are undesirable.

In order to decrease the accumulation of deposits, some systems utilize mixing devices. However, these mixing devices typically increase the back pressure of the system. Increasing back pressure in the exhaust aftertreatment system causes the exhaust aftertreatment system to operate inefficiently and is undesirable. Thus, these systems are faced with a tradeoff between deposit accumulation and increases in backpressure. To account for this tradeoff, some systems limit the rate at which the reductant can be used to treat the gas, emit higher levels of NOR, and/or perform frequent regeneration cycles.

Implementations described herein are related to a mixing assembly that ensures effective distribution of the reductant within the exhaust gas and mitigates the formation and accumulation of reductant deposits. Implementations described herein utilize an upstream plate having a plurality of openings, none of which receives (e.g., transmits, permits to pass, etc.) more than 60% of a total flow of the exhaust gas, a downstream plate having a single opening, a swirl plate that creates a swirl collection region and a swirl concentration region, and two splash plates that are positioned underneath the injector and aid in minimizing impingement of the reductant on various surfaces within the mixing assembly. The plurality of openings in the upstream plate are arranged to create shear flows and provide relatively high temperature exhaust gas to areas where reductant deposits may otherwise accumulate.

Through these features, implementations described herein are capable of effectively dispersing the reductant in the exhaust gas and mitigating the accumulation of reductant deposits. As a result, implementations described herein require less cleaning, result in less warranty claims, and enable decreased fuel consumption compared to other systems. Additionally, the implementations described herein may have a smaller space claim than other systems. Additionally, implementations herein provide for a smaller pressure drop than other systems due to the arrangement of the openings on the upstream plate, the swirl plate, the splash plates, and the opening in the downstream plate.

II. Overview of Exhaust Aftertreatment System

FIG. 1 depicts an exhaust aftertreatment system 100 having an example reductant delivery system 102 for an exhaust conduit system 104. The exhaust aftertreatment system 100 includes the reductant delivery system 102, a particulate filter (e.g., a diesel particulate filter (DPF)) 106, a decomposition chamber 108 (e.g., reactor, reactor pipe, etc.), and a SCR catalyst 110.

The DPF 106 is configured to (e.g., structured to, able to, etc.) remove particulate matter, such as soot, from exhaust gas flowing in the exhaust conduit system 104. The DPF 106 includes an inlet, where the exhaust gas is received, and an outlet, where the exhaust gas exits after having particulate matter substantially filtered from the exhaust gas and/or converting the particulate matter into carbon dioxide. In some implementations, the DPF 106 may be omitted.

The decomposition chamber 108 is configured to convert a reductant into ammonia. The reductant may be, for example, urea, diesel exhaust fluid (DEF), Adblue®, a urea water solution (UWS), an aqueous urea solution (e.g., AUS32, etc.), and other similar fluids. The decomposition chamber 108 includes an inlet in fluid communication with the DPF 106 to receive the exhaust gas containing $NO_x$ emissions and an outlet for the exhaust gas, $N_x$ emissions, ammonia, and/or reductant to flow to the SCR catalyst 110.

The decomposition chamber 108 includes the reductant delivery system 102. The reductant delivery system 102 includes a dosing module 112 (e.g., doser, etc.) configured to dose the reductant into the decomposition chamber 108 (e.g., via an injector). The dosing module 112 is mounted to the decomposition chamber 108 such that the dosing module 112 may dose the reductant into the exhaust gas flowing in the exhaust conduit system 104. The dosing module 112 may include an insulator interposed between a portion of the dosing module 112 and the portion of the decomposition chamber 108 on which the dosing module 112 is mounted.

The dosing module 112 is fluidly coupled to (e.g., fluidly configured to communicate with, etc.) a reductant source 114. The reductant source 114 may include multiple reductant sources 114. The reductant source 114 may be, for example, a diesel exhaust fluid tank containing Adblue®. A reductant pump 116 (e.g., supply unit, etc.) is used to pressurize the reductant from the reductant source 114 for delivery to the dosing module 112. In some embodiments, the reductant pump 116 is pressure controlled (e.g., controlled to obtain a target pressure, etc.). The reductant pump 116 includes a reductant filter 118. The reductant filter 118 filters (e.g., strains, etc.) the reductant prior to the reductant being provided to internal components (e.g., pistons, vanes, etc.) of the reductant pump 116. For example, the reductant filter 118 may inhibit or prevent the transmission of solids (e.g., solidified reductant, contaminants, etc.) to the internal components of the reductant pump 116. In this way, the reductant filter 118 may facilitate prolonged desirable operation of the reductant pump 116. In some embodiments, the reductant pump 116 is coupled to a chassis of a vehicle associated with the exhaust aftertreatment system 100.

The dosing module 112 includes at least one injector 120. Each injector 120 is configured to dose the reductant into the exhaust gas (e.g., within the decomposition chamber 108, etc.). In some embodiments, the reductant delivery system 102 also includes an air pump 122. In these embodiments, the air pump 122 draws air from an air source 124 (e.g., air intake, etc.) and through an air filter 126 disposed upstream of the air pump 122. Additionally, the air pump 122 provides the air to the dosing module 112 via a conduit. In these embodiments, the dosing module 112 is configured to mix the air and the reductant into an air-reductant mixture and to provide the air-reductant mixture into the decomposition chamber 108. In other embodiments, the reductant delivery system 102 does not include the air pump 122 or the air source 124. In such embodiments, the dosing module 112 is not configured to mix the reductant with air.

The dosing module 112 and the reductant pump 116 are also electrically or communicatively coupled to a reductant delivery system controller 128. The reductant delivery system controller 128 is configured to control the dosing module 112 to dose the reductant into the decomposition chamber 108. The reductant delivery system controller 128 may also be configured to control the reductant pump 116.

The reductant delivery system controller 128 includes a processing circuit 130. The processing circuit 130 includes a processor 132 and a memory 134. The processor 132 may include a microprocessor, an application-specific integrated circuit (ASIC), a field-programmable gate array (FPGA), etc., or combinations thereof. The memory 134 may include, but is not limited to, electronic, optical, magnetic, or any other storage or transmission device capable of providing a processor, ASIC, FPGA, etc. with program instructions. This memory 134 may include a memory chip, Electrically Erasable Programmable Read-Only Memory (EEPROM), Erasable Programmable Read Only Memory (EPROM), flash memory, or any other suitable memory from which the reductant delivery system controller 128 can read instructions. The instructions may include code from any suitable programming language. The memory 134 may include various modules that include instructions which are configured to be implemented by the processor 132.

The reductant delivery system controller 128 is configured to communicate with a central controller 136 (e.g., engine control unit (ECU), engine control module (ECM), etc.) of an internal combustion engine having the exhaust aftertreatment system 100. In some embodiments, the central controller 136 and the reductant delivery system controller 128 are integrated into a single controller.

In some embodiments, the central controller 136 is communicable with a display device (e.g., screen, monitor, touch screen, heads up display (HUD), indicator light, etc.). The display device may be configured to change state in response to receiving information from the central controller 136. For example, the display device may be configured to change between a static state (e.g., displaying a green light, displaying a "SYSTEM OK" message, etc.) and an alarm state (e.g., displaying a blinking red light, displaying a "SERVICE NEEDED" message, etc.). based on a communication from the central controller 136. By changing state, the display device may provide an indication to a user (e.g., operator, etc.) of a status (e.g., operation, in need of service, etc.) of the reductant delivery system 102.

The decomposition chamber 108 is located upstream of the SCR catalyst 110. As a result, the reductant is injected upstream of the SCR catalyst 110 such that the SCR catalyst 110 receives a mixture of the reductant and exhaust gas. The reductant droplets undergo the processes of evaporation, thermolysis, and hydrolysis to form non-$NO_x$ emissions (e.g., gaseous ammonia, etc.) within the exhaust conduit system 104.

The SCR catalyst 110 is configured to assist in the reduction of $NO_x$ emissions by accelerating a $NO_x$ reduction process between the ammonia and the $NO_x$ of the exhaust gas into diatomic nitrogen, water, and/or carbon dioxide. The SCR catalyst 110 includes an inlet in fluid communication with the decomposition chamber 108 from which exhaust gas and reductant are received and an outlet in fluid communication with an end of the exhaust conduit system 104.

The exhaust aftertreatment system 100 may further include an oxidation catalyst (e.g., a diesel oxidation catalyst (DOC)) in fluid communication with the exhaust conduit system 104 (e.g., downstream of the SCR catalyst 110 or upstream of the DPF 106) to oxidize hydrocarbons and carbon monoxide in the exhaust gas.

In some implementations, the DPF 106 may be positioned downstream of the decomposition chamber 108. For instance, the DPF 106 and the SCR catalyst 110 may be combined into a single unit. In some implementations, the dosing module 112 may instead be positioned downstream of a turbocharger or upstream of a turbocharger.

The exhaust aftertreatment system 100 also includes a mixing assembly 138 (e.g., mixer, multi-stage mixer, etc.). The mixing assembly 138 is disposed between a decomposition chamber upstream portion 140 and a decomposition chamber downstream portion 142. Together, the decomposition chamber upstream portion 140, the mixing assembly 138, and the decomposition chamber downstream portion 142, form the mixing assembly 138. The dosing module 112 is coupled to the mixing assembly 138 and the injector 120 is configured to dose the reductant into the mixing assembly 138. As will be explained in more detail herein, the mixing assembly 138 functions to mix the exhaust gas received from the decomposition chamber upstream portion 140 with the reductant provided by the mixing assembly 138 and provide the decomposition chamber downstream portion 142 with exhaust gas that have been mixed with the reductant.

III. Example Mixing Assembly

FIGS. 2-12 illustrate the mixing assembly 138 in greater detail. The mixing assembly 138 includes a mixing body 200 (e.g., frame, structure, etc.). The mixing body 200 has a mixing body center axis $C_{body}$. The mixing body 200 is generally cylindrical and has a mixing body diameter $D_{mb}$ that is less than the mixing body upstream coupler diameter $D_{mbuc}$. In various embodiments, the mixing body diameter $D_{mb}$ is between 200 millimeters (mm) and 220 mm, inclusive. In some embodiments, the mixing body diameter $D_{mb}$ is approximately equal to 210.9 mm.

The mixing assembly 138 also includes a mixing body upstream coupler 202 (e.g., joint, flange, channel, etc.). The mixing body 200 is contiguous with the mixing body upstream coupler 202. In various embodiments, the mixing body upstream coupler 202 is welded, fastened, or otherwise coupled to the mixing body 200. The mixing body upstream coupler 202 is configured to be (e.g., structured to be, capable of being, etc.) positioned adjacent to the decomposition chamber upstream portion 140. In some embodiments, the mixing body upstream coupler 202 is coupled to the decomposition chamber upstream portion 140. The mixing body upstream coupler 202 is generally cylindrical and has a mixing body upstream coupler diameter $D_{mbuc}$. In various embodiments, the mixing body upstream coupler diameter $D_{mbuc}$ is between 220 mm and 250 mm, inclusive. In some embodiments, the mixing body upstream coupler diameter $D_{mbuc}$ is approximately equal to 239.2 mm.

The mixing assembly 138 also includes a mixing body downstream coupler 206 (e.g., joint, flange, etc.). The mixing body downstream coupler 206 is configured to positioned adjacent to the decomposition chamber downstream portion 142. In some embodiments, the mixing body downstream coupler 206 is coupled to the decomposition chamber downstream portion 142. The mixing body downstream coupler 206 is contiguous with the mixing body 200. In various embodiments, the mixing body downstream coupler 206 is structurally integrated with (e.g., formed from the same material as, etc.) the mixing body 200. The mixing body downstream coupler 206 is generally cylindrical and has a mixing body downstream coupler diameter $D_{mbdc}$ that is greater than the mixing body diameter $D_{mbc}$. In various embodiments, the mixing body downstream coupler diameter $D_{mbdc}$ is approximately (e.g., is within 5% of, is within 2% of, etc.) equal to the mixing body upstream coupler diameter $D_{mbuc}$. In various embodiments, the mixing body downstream coupler diameter $D_{mbdc}$ is between 220 mm and 250 mm, inclusive. In some embodiments, the mixing body downstream coupler diameter $D_{mbdc}$ is approximately equal to 238.2 mm.

The mixing body upstream coupler 202 has a mixing body upstream coupler plane $P_{upstream}$. The mixing body upstream coupler plane $P_{upstream}$ is coincident with an outermost edge of the mixing body upstream coupler 202. The mixing body center axis $C_{body}$ is orthogonal to the mixing body upstream coupler plane $P_{upstream}$ and extends through the mixing body upstream coupler plane $P_{upstream}$.

The mixing body downstream coupler 206 has a mixing body downstream coupler plane $P_{downstream}$. The mixing body downstream coupler plane $P_{downstream}$ is coincident with an outermost edge of the mixing body downstream coupler 206. The mixing body center axis $C_{body}$ is orthogonal to the mixing body downstream coupler plane $P_{downstream}$ and extends through the mixing body downstream coupler plane $P_{downstream}$.

The mixing body upstream coupler plane $P_{upstream}$ is parallel to the mixing body downstream coupler plane $P_{downstream}$. The mixing body upstream coupler plane $P_{upstream}$ is separated from the mixing body downstream coupler plane $P_{downstream}$ by a mixing body length $L_{body}$ (e.g., as measured along an axis parallel to the mixing body center axis $C_{body}$). In various embodiments, the mixing body length $L_{body}$ is between 120 mm and 145 mm, inclusive. In some embodiments, the mixing body length $L_{body}$ is approximately equal to 134.8 mm.

The mixing assembly 138 also includes an injector mount 208. The injector mount 208 is coupled to the mixing body 200. For example, the injector mount 208 may be welded or fastened to the mixing body 200. The injector mount 208 is configured to couple the injector 120 to the mixing body 200. The injector 120 has an injector center axis $C_{injector}$. As will be explained in more detail herein, the injector 120 is configured to dose the reductant into the mixing body 200 along the injector center axis $C_{injector}$.

The injector mount 208 is also defined by an injector plane $P_{injector}$ along which the injector center axis $C_{injector}$ is disposed when the injector 120 is coupled to the mixing body 200 via the injector mount 208. In various embodiments, the injector plane $P_{injector}$ is parallel to the mixing body upstream coupler plane $P_{upstream}$ and the mixing body downstream coupler plane $P_{downstream}$.

The injector mount 208 is further defined by an first injector angle $\alpha_{injector}$ and a second injector angle $\beta_{injector}$. The first injector angle $\alpha_{injector}$ is measured between the injector center axis $C_{injector}$ and a first reference axis $G_1$ that is disposed along the injector plane $P_{injector}$ and orthogonal to the mixing body center axis $C_{body}$. In various embodiments, the first injector angle $\alpha_{injector}$ is between 90° and 110°, inclusive. In some embodiments, the first reference axis $G_1$ is substantially horizontal (e.g., within 5% of a horizontal axis, parallel to the horizontal axis, etc.). The second injector angle $\beta_{injector}$ is measured between the injector center axis $C_{injector}$ and a second reference axis $G_2$ that extends through the injector plane $P_{injector}$ and is parallel to the mixing body center axis $C_{body}$. In various embodiments, the second injector angle $\beta_{injector}$ is between 80° and 110°, inclusive. In some embodiments, the second injector angle $\beta_{injector}$ is 90°.

The injector plane $P_{injector}$ is separated from the mixing body upstream coupler plane $P_{upstream}$ by an injector length $L_{injector}$. The injector length $L_{injector}$ is measured along a direction parallel to the mixing body center axis $C_{body}$. In some embodiments, the injector length $L_{injector}$ is between 30% and 60%, inclusive (e.g., 30%, 35%, 40%, 45%, 50%, 55%, 60%, etc.) of the mixing body length $L_{body}$. In one embodiment, the injector length $L_{injector}$ is 35% of the mixing body length $L_{body}$. In embodiments where the second injector angle $\beta_{injector}$ is not 90°, the injector length $L_{injector}$ is the maximum distance separating the injector plane $P_{injector}$ from the mixing body upstream coupler plane $P_{upstream}$ within the mixing body 200. In various embodiments, the injector length $L_{injector}$ is between 35 mm and 55 mm, inclusive. In some embodiments, the injector length $L_{injector}$ is approximately equal to 47.2 mm.

Figure 3:
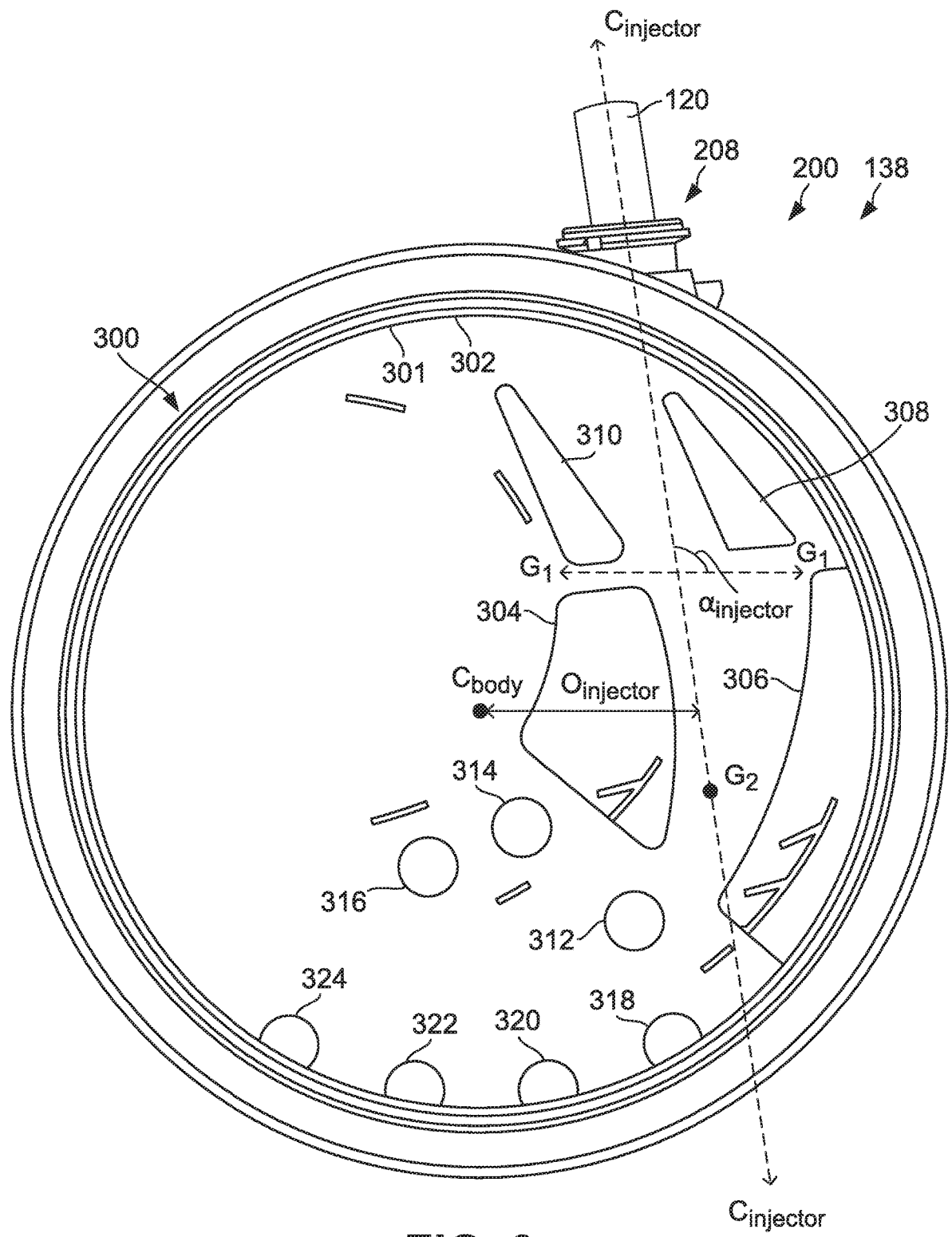
FIG. 3 is a front side view of the mixing assembly shown in FIG. 2 from an upstream side looking downstream.

FIG. 3 illustrates the mixing assembly 138 looking from the mixing body upstream coupler 202 and towards the mixing body downstream coupler 206 (which is not shown in FIG. 3). The injector center axis $C_{injector}$ is separated from the mixing body center axis $C_{body}$ by an injector offset $O_{injector}$. The injector offset $O_{injector}$ is measured along an axis that is orthogonal to and coincident with the mixing body center axis $C_{body}$. In some embodiments, the injector offset $O_{injector}$ is between 15% and 30%, inclusive (e.g., 15%, 20%, 25%, 30%, 35%, etc.) of the mixing body diameter $D_{mb}$. In some embodiments, the injector offset $O_{injector}$ is approximately 23% of the mixing body diameter $D_{mb}$. In various embodiments, the injector offset $O_{injector}$ is between 35 mm and 60 mm, inclusive. In some embodiments, the injector offset $O_{injector}$ is approximately equal to 48.6 mm.

The injector mount 208 may be configured such that the first injector angle $\alpha_{injector}$, the second injector angle $\beta_{injector}$, the injector length $L_{injector}$, or the injector offset $O_{injector}$ have target values such that the mixing assembly 138 is tailored for a target application. In some embodiments, the first injector angle $\alpha_{injector}$, the second injector angle $\beta_{injector}$, the injector length $L_{injector}$, or the injector offset $O_{injector}$ are selected based on the injector 120. In other embodiments, the injector 120 is selected based on any of the first injector angle $\alpha_{injector}$, the second injector angle $\beta_{injector}$, the injector length $L_{injector}$, or the injector offset $O_{injector}$.

The mixing assembly 138 also includes an upstream plate 300. The upstream plate 300 is coupled to the mixing body 200 across or within an upstream mixing body opening 301 of the mixing body 200. The upstream plate 300 includes an upstream plate edge 302 that is coupled to the mixing body 200 relative to the injector axis $C_{injector}$. For example, the upstream plate edge 302 may include an alignment feature (e.g., tab, recess, etc.) that is received within an alignment feature in the mixing body 200 when the upstream plate edge 302 is coupled to the mixing body 200 and the alignment features may be positioned based upon the injector axis $C_{injector}$. In various embodiments, the upstream plate edge 302 is welded or fastened to the mixing body 200. The upstream plate 300 separates a portion (e.g., a downstream portion, etc.) of the mixing body 200 from the decomposition chamber upstream portion 140 such that exhaust gas flowing into the mixing body 200 must first pass through upstream plate 300.

The upstream plate 300 is shown and described herein with relation to an example embodiment. It is understood that the configuration of the upstream plate 300 may be different for various applications. For example, the configuration of the upstream plate 300 may change based upon the arrangement of the injector center axis $C_{injector}$.

The upstream plate 300 includes a first upstream plate opening 304. The first upstream plate opening 304 provides a pathway for the exhaust gas to pass through the upstream plate 300. The first upstream plate opening 304 has a first upstream plate opening area $A_1$ which is the cross-sectional area through which the exhaust gas passes through the upstream plate 300 at a first flow rate percentage (e.g., mass flow rate percentage, volumetric flow rate percentage, etc.) $F_1$ via the first upstream plate opening 304. The first upstream plate opening 304 is not contiguous with the upstream plate edge 302. In this way, the first upstream plate opening 304 is entirely bordered by (e.g., is placed within, etc.) the upstream plate 300.

The upstream plate 300 includes a second upstream plate opening 306. The second upstream plate opening 306 provides another pathway for the exhaust gas to pass through the upstream plate 300. The second upstream plate opening 306 has a second upstream plate opening area $A_2$ which is the cross-sectional area through which the exhaust gas passes through the upstream plate 300 at a second flow rate percentage $F_2$ via the second upstream plate opening 306. In an example embodiment, the second upstream plate opening area $A_2$ is greater than the first upstream plate opening area $A_1$ and the second flow rate percentage $F_2$ is less than the first flow rate percentage $F_1$. Unlike the first upstream plate opening 304, the second upstream plate opening 306 is contiguous with the upstream plate edge 302. In this way, the second upstream plate opening 306 is bordered by the upstream plate 300 and the mixing body 200.

The upstream plate 300 includes a third upstream plate opening 308. The third upstream plate opening 308 provides yet another pathway for the exhaust gas to pass through the upstream plate 300. The third upstream plate opening 308 has a third upstream plate opening area $A_3$ which is the cross-sectional area through which the exhaust gas passes through the upstream plate 300 at a third flow rate percentage $F_3$ via the third upstream plate opening 308. In the example embodiment, the third upstream plate opening area $A_3$ is less than the second upstream plate opening area $A_2$ and the third flow rate percentage $F_3$ is less than the second flow rate percentage $F_2$. The third upstream plate opening 308 is not contiguous with the upstream plate edge 302. In this way, the third upstream plate opening 308 is entirely bordered by the upstream plate 300.

The upstream plate 300 includes a fourth upstream plate opening 310. The fourth upstream plate opening 310 provides yet another pathway for the exhaust gas to pass through the upstream plate 300. The fourth upstream plate opening 310 has a fourth upstream plate opening area $A_4$ which is the cross-sectional area through which the exhaust gas passes through the upstream plate 300 at a fourth flow rate percentage $F_4$ via the fourth upstream plate opening 310. In the example embodiment, the fourth upstream plate opening area $A_4$ is less than the third upstream plate opening area $A_3$ and the fourth flow rate percentage $F_4$ is less than the third flow rate percentage $F_3$. The fourth upstream plate opening 310 is not contiguous with the upstream plate edge 302. In this way, the fourth upstream plate opening 310 is entirely bordered by the upstream plate 300.

The upstream plate 300 includes a fifth upstream plate opening 312. The fifth upstream plate opening 312 provides yet another pathway for the exhaust gas to pass through the upstream plate 300. The fifth upstream plate opening 312 has a fifth upstream plate opening area $A_5$ which is the cross-sectional area through which the exhaust gas passes through the upstream plate 300 at a fifth flow rate percentage $F_5$ via the fifth upstream plate opening 312. In the example embodiment, the fifth upstream plate opening area $A_5$ is less than the fourth upstream plate opening area $A_4$ and the fifth flow rate percentage $F_5$ is less than the fourth flow rate percentage $F_4$. The fifth upstream plate opening 312 is not contiguous with the upstream plate edge 302. In this way, the fifth upstream plate opening 312 is entirely bordered by the upstream plate 300. Unlike the first upstream plate opening 304, the second upstream plate opening 306, the third upstream plate opening 308, and the fourth upstream plate opening 310, the fifth upstream plate opening 312 is substantially circular.

The upstream plate 300 includes a sixth upstream plate opening 314. The sixth upstream plate opening 314 provides yet another pathway for the exhaust gas to pass through the upstream plate 300. The sixth upstream plate opening 314 has a sixth upstream plate opening area $A_6$ which is the cross-sectional area through which the exhaust gas passes through the upstream plate 300 at a sixth flow rate percentage $F_6$ via the sixth upstream plate opening 314. In the example embodiment, the sixth upstream plate opening area $A_6$ is approximately equal to the fifth upstream plate opening area $A_5$ and the sixth flow rate percentage $F_6$ is less than the fourth flow rate percentage $F_4$ and greater than the fifth flow rate percentage $F_5$. The sixth upstream plate opening 314 is not contiguous with the upstream plate edge 302. In this way, the sixth upstream plate opening 314 is entirely bordered by the upstream plate 300. Like the fifth upstream plate opening 312, the sixth upstream plate opening 314 is substantially circular.

The upstream plate 300 includes a seventh upstream plate opening 316. The seventh upstream plate opening 316 provides yet another pathway for the exhaust gas to pass through the upstream plate 300. The seventh upstream plate opening 316 has a seventh upstream plate opening area $A_7$ which is the cross-sectional area through which the exhaust gas passes through the upstream plate 300 at a seventh flow rate percentage $F_7$ via the seventh upstream plate opening 316. In the example embodiment, the seventh upstream plate opening area $A_7$ is approximately equal to the fifth upstream plate opening area $A_5$ and the seventh flow rate percentage $F_7$ is less than the sixth flow rate percentage $F_6$ and greater than the fifth flow rate percentage $F_5$. The seventh upstream plate opening 316 is not contiguous with the upstream plate edge 302. In this way, the seventh upstream plate opening 316 is entirely bordered by the upstream plate 300. Like the fifth upstream plate opening 312, the seventh upstream plate opening 316 is substantially circular.

The upstream plate 300 includes an eighth upstream plate opening 318. The eighth upstream plate opening 318 provides yet another pathway for the exhaust gas to pass through the upstream plate 300. The eighth upstream plate opening 318 has an eighth upstream plate opening area $A_8$ which is the cross-sectional area through which the exhaust gas passes through the upstream plate 300 at an eighth flow rate percentage $F_8$ via the eighth upstream plate opening 318. In the example embodiment, the eighth upstream plate opening area $A_8$ is less than the fifth upstream plate opening area $A_5$ and the eighth flow rate percentage $F_8$ is less than the fifth flow rate percentage $F_5$. Like the second upstream plate opening 306, the eighth upstream plate opening 318 is contiguous with the upstream plate edge 302. In this way, the eighth upstream plate opening 318 is bordered by the upstream plate 300 and the mixing body 200. The eighth upstream plate opening 318 is substantially semi-circular.

The upstream plate 300 includes a ninth upstream plate opening 320. The ninth upstream plate opening 320 provides yet another pathway for the exhaust gas to pass through the upstream plate 300. The ninth upstream plate opening 320 has a ninth upstream plate opening area $A_9$ which is the cross-sectional area through which the exhaust gas passes through the upstream plate 300 at a ninth flow rate percentage $F_9$ via the ninth upstream plate opening 320. In the example embodiment, the ninth upstream plate opening area $A_9$ is approximately equal to the eighth upstream plate opening area $A_8$ and the ninth flow rate percentage $F_9$ is greater than the eighth flow rate percentage $F_8$ and less than the fifth flow rate percentage $F_5$. Like the second upstream plate opening 306, the ninth upstream plate opening 320 is contiguous with the upstream plate edge 302. In this way, the ninth upstream plate opening 320 is bordered by the upstream plate 300 and the mixing body 200. Like the eighth upstream plate opening 318, the ninth upstream plate opening 320 is substantially semi-circular.

The upstream plate 300 includes a tenth upstream plate opening 322. The tenth upstream plate opening 322 provides yet another pathway for the exhaust gas to pass through the upstream plate 300. The tenth upstream plate opening 322 has a tenth upstream plate opening area $A_{10}$ which is the cross-sectional area through which the exhaust gas passes through the upstream plate 300 at a tenth flow rate percentage $F_{10}$ via the tenth upstream plate opening 322. In the example embodiment, the tenth upstream plate opening area $A_{10}$ is approximately equal to the eighth upstream plate opening area $A_8$ and the tenth flow rate percentage $F_{10}$ is approximately equal to the ninth flow rate percentage $F_9$. Like the second upstream plate opening 306, the tenth upstream plate opening 322 is contiguous with the upstream plate edge 302. In this way, the tenth upstream plate opening 322 is bordered by the upstream plate 300 and the mixing body 200. Like the eighth upstream plate opening 318, the tenth upstream plate opening 322 is substantially semi-circular.

The upstream plate 300 includes an eleventh upstream plate opening 324. The eleventh upstream plate opening 324 provides yet another pathway for the exhaust gas to pass through the upstream plate 300. The eleventh upstream plate opening 324 has an eleventh upstream plate opening area $A_{11}$ which is the cross-sectional area through which the exhaust gas passes through the upstream plate 300 at an eleventh flow rate percentage $F_{11}$ via the eleventh upstream plate opening 324. In the example embodiment, the eleventh upstream plate opening area $A_{11}$ is approximately equal to the eighth upstream plate opening area $A_8$ and the eleventh flow rate percentage $F_{11}$ is approximately equal to the ninth flow rate percentage $F_9$. Like the second upstream plate opening 306, the eleventh upstream plate opening 324 is contiguous with the upstream plate edge 302. In this way, the eleventh upstream plate opening 324 is bordered by the upstream plate 300 and the mixing body 200. Like the eighth upstream plate opening 318, the eleventh upstream plate opening 324 is substantially semi-circular.

In summary, the upstream plate 300 is configured such that $$A_{11} \cong A_{10} \cong A_9 \cong A_8 < A_7 \cong A_6 \cong A_5 < A_4 < A_3 < A_1 < A_2 \quad (1)$$

$$F_8 < F_{11} \cong F_{10} \cong F_9 < F_5 < F_7 < F_6 < F_4 < F_3 < F_2 < F_1 \quad (2)$$

$$100\% = F_1 + F_2 + F_3 + F_4 + F_5 + F_6 + F_7 + F_8 + F_9 + F_{10} + F_{11} \quad (3)$$

in the example embodiment. Table 1 illustrates a configuration of the upstream plate 300 according to the example embodiment.

TABLE 1

Flow Rate Percentages of the Total Flow of the Exhaust Gas Through the Upstream Plate 300 in the Example Embodiment.

| | |
|---|---|
| $F_1$ | 32.6967% |
| $F_2$ | 29.9112% |
| $F_3$ | 6.7403% |
| $F_4$ | 6.5756% |
| $F_5$ | 3.053% |
| $F_6$ | 3.5001% |
| $F_7$ | 3.2217% |
| $F_8$ | 1.98608% |
| $F_9$ | 2.3371% |
| $F_{10}$ | 2.359% |
| $F_{11}$ | 2.35% |

In other applications, the upstream plate 300 has other similar configurations so that the upstream plate 300 can be tailored for a target application. However, the upstream plate 300 is always configured such that none of the first flow rate percentage $F_1$, the second flow rate percentage $F_2$, the third flow rate percentage $F_3$, the fourth flow rate percentage $F_4$, the fifth flow rate percentage $F_5$, the sixth flow rate percentage $F_6$, the seventh flow rate percentage $F_7$, the eighth flow rate percentage $F_8$, the ninth flow rate percentage $F_9$, the tenth flow rate percentage $F_{10}$, or the eleventh flow rate percentage $F_{11}$ are equal to or exceed 60% of the total flow of the exhaust gas. For example, in some embodiments, none of the first flow rate percentage $F_1$, the second flow rate percentage $F_2$, the third flow rate percentage $F_3$, the fourth flow rate percentage $F_4$, the fifth flow rate percentage $F_5$, the sixth flow rate percentage $F_6$, the seventh flow rate percentage $F_7$, the eighth flow rate percentage $F_8$, the ninth flow rate percentage $F_9$, the tenth flow rate percentage $F_{10}$, or the eleventh flow rate percentage $F_{11}$ are equal to or exceed 50% of the total flow of the exhaust gas. In other embodiments, none of the first flow rate percentage $F_1$, the second flow rate percentage $F_2$, the third flow rate percentage $F_3$, the fourth flow rate percentage $F_4$, the fifth flow rate percentage $F_5$, the sixth flow rate percentage $F_6$, the seventh flow rate percentage $F_7$, the eighth flow rate percentage $F_8$, the ninth flow rate percentage $F_9$, the tenth flow rate percentage $F_{10}$, or the eleventh flow rate percentage $F_{11}$ are equal to or exceed 45% of the total flow of the exhaust gas. In still other embodiments, none of the first flow rate percentage $F_1$, the second flow rate percentage $F_2$, the third flow rate percentage $F_3$, the fourth flow rate percentage $F_4$, the fifth flow rate percentage $F_5$, the sixth flow rate percentage $F_6$, the seventh flow rate percentage $F_7$, the eighth flow rate percentage $F_8$, the ninth flow rate percentage $F_9$, the tenth flow rate percentage $F_{10}$, or the eleventh flow rate percentage $F_{11}$ are equal to or exceed 40% of the total flow of the exhaust gas.

In various embodiments, the following configurations of the upstream plate 300 are utilized:

$$20\% \leq F_1 \leq 40\% \quad (4)$$

$$20\% \leq F_2 \leq 40\% \quad (5)$$

$$4\% \leq F_3 \leq 20\% \quad (6)$$

$$4\% \leq F_4 \leq 15\% \quad (7)$$

$$1\% \leq F_5 \leq 5\% \quad (8)$$

$$1.5\% \leq F_6 \leq 12\% \quad (9)$$

$$1\% \leq F_7 \leq 5\% \quad (10)$$

$$0.25\% \leq F_8 \leq 4.25\% \quad (11)$$

$$0.5\% \leq F_9 \leq 12\% \quad (12)$$

$$0.5\% \leq F_{10} \leq 4.5\% \quad (13)$$

$$0.5\% \leq F_{11} \leq 4.5\% \quad (14)$$

Figure 4:
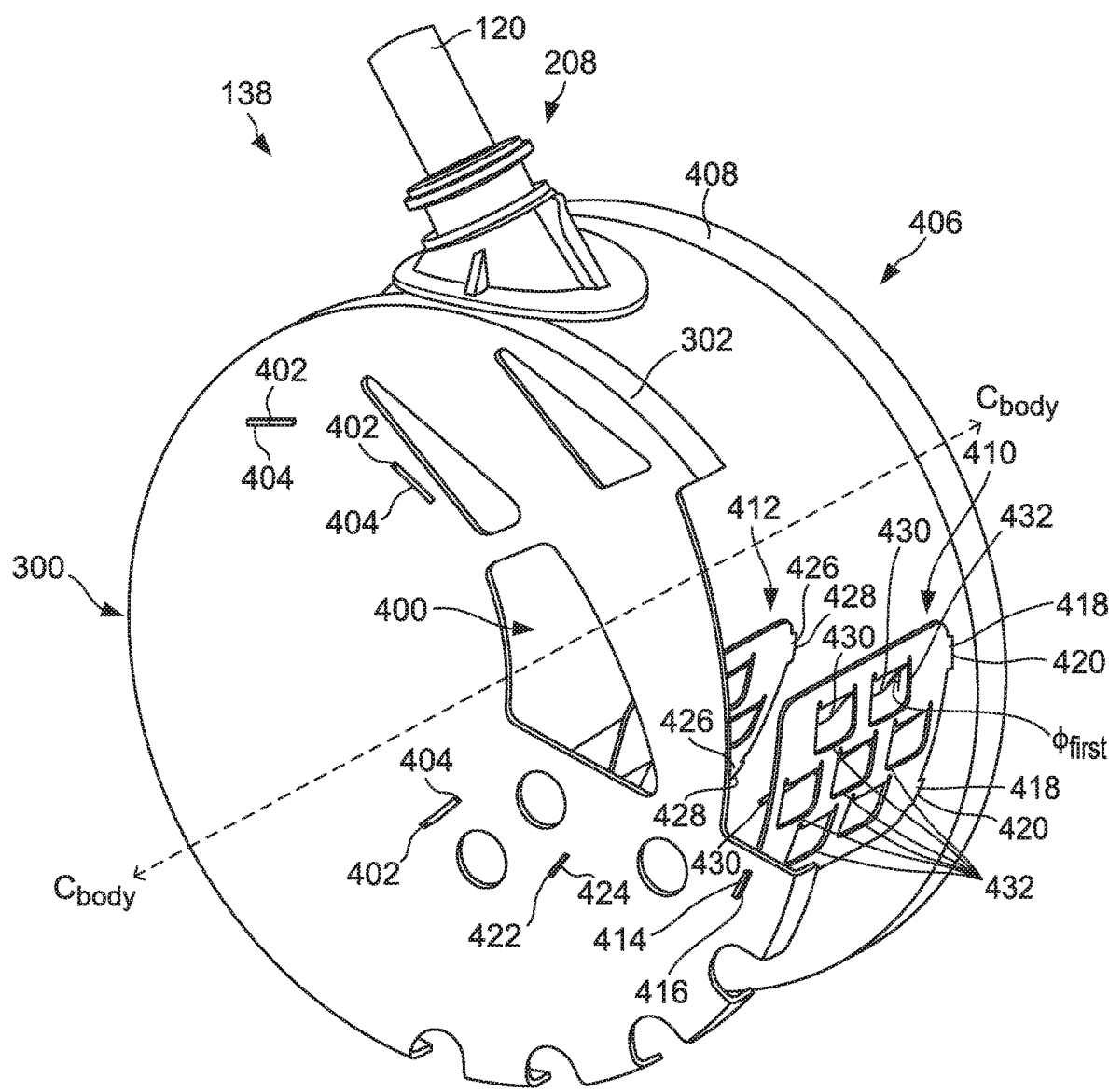
FIG. 4 is a perspective view of the mixing assembly shown in FIG. 2 with certain components omitted to allow for viewing of certain other components.

FIG. 4 illustrates the mixing assembly 138 with the mixing body upstream coupler 202, the mixing body 200, and the mixing body downstream coupler 206 hidden. The mixing assembly 138 also includes a swirl plate 400. The swirl plate 400 is disposed downstream of the upstream plate 300 and is coupled to the upstream plate 300 relative to the injector axis $C_{injector}$. As will be explained in more detail, the swirl plate 400 interfaces with the exhaust gas after the exhaust gas has flowed through the upstream plate 300 and functions to cause the exhaust gas to swirl. This swirl enhances mixing of the reductant provided by the injector 120 into the exhaust gas and therefore enhances the decomposition of NOR.

An upstream edge of the swirl plate 400 is located adjacent to (e.g., in confronting relation with, next to, etc.) the upstream plate 300 such that the flow of the exhaust gas between the swirl plate 400 and the upstream plate 300 is prevented or minimized. In various embodiments, the swirl plate 400 includes upstream swirl plate tabs 402 that facilitate coupling of the swirl plate 400 to the upstream plate 300. In some of these embodiments, the upstream plate 300 includes upstream swirl plate openings 404 that are configured to receive the upstream swirl plate tabs 402. In these embodiments, the upstream swirl plate tabs 402 may be inserted into the upstream swirl plate openings 404 and the upstream swirl plate tabs 402 may be bent over the upstream plate 300 or welded or fastened to the upstream plate 300. In other embodiments, the upstream plate 300 does not include the upstream swirl plate openings 404 and the upstream swirl plate tabs 402 are welded or fastened to the upstream plate 300. In still other embodiments, the swirl plate 400 does not include the upstream swirl plate tabs 402. In these embodiments, an upstream edge of the swirl plate 400 is welded or fastened to the upstream plate 300. In yet other embodiments, the swirl plate 400 is not coupled to the upstream plate 300.

The mixing assembly 138 also includes a downstream plate 406. The downstream plate 406 can be seen in FIG. 3 through the first upstream plate opening 304, the second upstream plate opening 306, the third upstream plate opening 308, the fourth upstream plate opening 310, the fifth upstream plate opening 312, the sixth upstream plate opening 314, the seventh upstream plate opening 316, the eighth upstream plate opening 318, the ninth upstream plate opening 320, the tenth upstream plate opening 322, and the eleventh upstream plate opening 324.

The downstream plate 406 includes a downstream plate edge 408 that is coupled to the mixing body 200 relative to the injector axis $C_{injector}$. For example, the downstream plate edge 408 may include an alignment feature that is received within an alignment feature in the mixing body 200 when the downstream plate edge 408 is coupled to the mixing body 200 and the alignment features may be positioned based upon the injector axis $C_{injector}$. In various embodiments, the downstream plate edge 408 is welded or fastened to the mixing body 200. The downstream plate 406 separates a portion (e.g., an upstream portion, etc.) of the mixing body 200 from the decomposition chamber downstream portion 142 such that exhaust gas flowing out of the mixing body 200 must first pass through downstream plate 406. The downstream plate 406 is disposed downstream of the swirl plate 400 and is coupled to the swirl plate 400 relative to the injector axis $C_{injector}$. As will be explained in more detail herein, a downstream edge of the swirl plate 400 is located adjacent to the downstream plate 406 such that the flow of the exhaust gas between the swirl plate 400 and the downstream plate 406 is prevented or minimized.

The mixing assembly 138 also includes a first splash plate 410 and a second splash plate 412. The first splash plate 410 and the second splash plate 412 are disposed downstream of the upstream plate 300 and upstream of the downstream plate 406. The first splash plate 410 and the second splash plate 412 are coupled to the upstream plate 300 relative to the injector axis $C_{injector}$ and coupled to the downstream plate 406 relative to the injector axis $C_{injector}$. As will be explained in more detail herein, the first splash plate 410 and the second splash plate 412 are configured to interface with the reductant that is dosed into the mixing body 200 by the injector 120 and cooperate with the swirl plate 400 to guide the exhaust gas that flows through the upstream plate 300 so as to create a swirl.

In various embodiments, the first splash plate 410 includes an upstream first splash plate tab 414 that facilitates coupling of the first splash plate 410 to the upstream plate 300. In various embodiments, the upstream plate 300 includes an upstream first splash plate opening 416 that is configured to receive the upstream first splash plate tab 414. In these embodiments, the upstream first splash plate tab 414 may be inserted into the upstream first splash plate opening 416 and the upstream first splash plate tab 414 may be bent over the upstream plate 300 or welded or fastened to the upstream plate 300. In other embodiments, the upstream plate 300 does not include the upstream first splash plate opening 416 and the upstream first splash plate tab 414 is welded or fastened to the upstream plate 300. In still other embodiments, the first splash plate 410 does not include the upstream first splash plate tab 414. In these embodiments, an edge of the first splash plate 410 is welded or fastened to the upstream plate 300.

In various embodiments, the first splash plate 410 includes downstream first splash plate tabs 418 that facilitates coupling of the first splash plate 410 to the downstream plate 406. In various embodiments, the downstream plate 406 includes downstream first splash plate openings 420 that are configured to receive the downstream first splash plate tabs 418. In these embodiments, the downstream first splash plate tabs 418 may be inserted into the downstream first splash plate openings 420 and the downstream first splash plate tabs 418 may be bent over the downstream plate 406 or welded or fastened to the downstream plate 406. In other embodiments, the downstream plate 406 does not include the downstream first splash plate openings 420 and the downstream first splash plate tabs 418 are welded or fastened to the downstream plate 406. In still other embodiments, the first splash plate 410 does not include the downstream first splash plate tabs 418. In these embodiments, an edge of the first splash plate 410 is welded or fastened to the downstream plate 406.

In various embodiments, the second splash plate 412 includes an upstream second splash plate tab 422 that facilitates coupling of the second splash plate 412 to the upstream plate 300. In various embodiments, the upstream plate 300 includes an upstream second splash plate opening 424 that is configured to receive the upstream second splash plate tab 422. In these embodiments, the upstream second splash plate tab 422 may be inserted into the upstream second splash plate opening 424 and the upstream second splash plate tab 422 may be bent over the upstream plate 300 or welded or fastened to the upstream plate 300. In other embodiments, the upstream plate 300 does not include the upstream second splash plate opening 424 and the upstream second splash plate tab 422 is welded or fastened to the upstream plate 300. In still other embodiments, the second splash plate 412 does not include the upstream second splash plate tab 422. In these embodiments, an edge of the second splash plate 412 is welded or fastened to the upstream plate 300.

In various embodiments, the second splash plate 412 includes downstream second splash plate tabs 426 that facilitates coupling of the second splash plate 412 to the downstream plate 406. In various embodiments, the downstream plate 406 includes downstream second splash plate openings 428 that are configured to receive the downstream second splash plate tabs 426. In these embodiments, the downstream second splash plate tabs 426 may be inserted into the downstream second splash plate openings 428 and the downstream second splash plate tabs 426 may be bent over the downstream plate 406 or welded or fastened to the downstream plate 406. In other embodiments, the downstream plate 406 does not include the downstream second splash plate openings 428 and the downstream second splash plate tabs 426 are welded or fastened to the downstream plate 406. In still other embodiments, the second splash plate 412 does not include the downstream second splash plate tabs 426. In these embodiments, an edge of the second splash plate 412 is welded or fastened to the downstream plate 406.

As a result of the arrangement of the upstream plate 300, the swirl plate 400, the downstream plate 406, the first splash plate 410, and the second splash plate 412, the swirl plate 400, the first splash plate 410, and the second splash plate 412 have identical lengths, as measured along the mixing body center axis $C_{body}$ and between the upstream plate 300 and the downstream plate 406. As such, when the mixing assembly 138 is reconfigured such that the length, as measured along the mixing body center axis $C_{body}$, is increased or decreased, the lengths of the swirl plate 400, the first splash plate 410, and the second splash plate 412, as measured along the mixing body center axis $C_{body}$, are correspondingly increased or decreased.

The first splash plate 410 comprises a plurality of first splash members 430. Each of the first splash members 430 is deflected a first splash angle $\varphi_{first}$ from the first splash plate 410 towards the mixing body center axis $C_{body}$. In some embodiments, the first splash angle $\varphi_{first}$ varies amongst the first splash members 430 in order to optimize mixing of the reductant and the exhaust gas. In various embodiments, the first splash angle $\varphi_{first}$ is between 30° and 45°, inclusive. In some embodiments, the first splash angle $\varphi_{first}$ is approximately equal to 38°. Some of the exhaust gas flowing through the upstream plate 300 is propelled against the first splash members 430 which, based on the first splash angle $\varphi_{first}$, cause the exhaust gas to redirected towards the mixing body center axis $C_{body}$. By including additional of the first splash members 430, or by increasing the area of the first splash members 430, the first splash plate 410 could redirect more of the exhaust gas towards the mixing body center axis $C_{body}$. Similarly, by including fewer of the first splash members 430, or by decreasing the area of the first splash members 430, the first splash plate 410 could redirect less of the exhaust gas towards the mixing body center axis $C_{body}$. Additionally, by increasing or decreasing the first splash angle $\varphi_{first}$, the exhaust gas can be redirected closer to the mixing body center axis $C_{body}$ or further from the mixing body center axis $C_{body}$.

In various embodiments, the first splash plate 410 also includes a plurality of first splash openings 432. In these embodiments, each of the first splash members 430 is contiguous with one of the first splash openings 432. In other embodiments, the first splash plate 410 does not include the first splash openings 432. In these embodiments, the first splash plate 410 may be corrugated and the first splash members 430 may be formed from the corrugations of the first splash plate 410.

Figure 5:
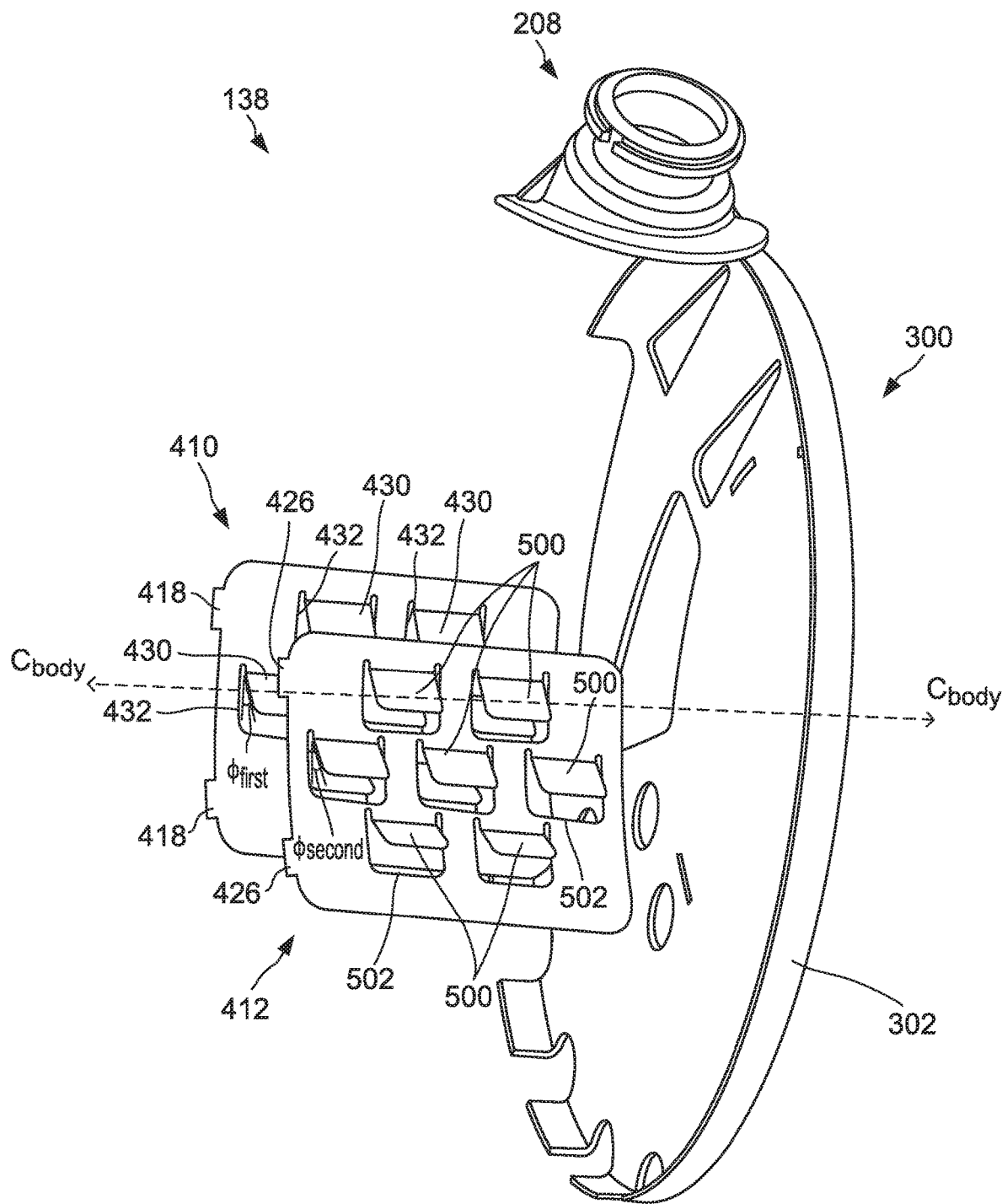
FIG. 5 is another perspective view of the mixing assembly shown in FIG. 2 with certain components omitted.

FIG. 5 illustrates the mixing assembly 138 with the mixing body upstream coupler 202, the mixing body 200, the mixing body downstream coupler 206, the swirl plate 400, and the downstream plate 406 hidden. The second splash plate 412 comprises a plurality of second splash members 500. Each of the second splash members 500 is deflected a second splash angle $\varphi_{second}$ from the second splash plate 412 towards the mixing body center axis $C_{body}$. In some embodiments, the second splash angle $\varphi_{second}$ varies amongst the second splash members 500 in order to optimize mixing of the reductant and the exhaust gas. In some embodiments, the second splash angle $\varphi_{second}$ varies amongst the second splash members 500. In various embodiments, the second splash angle $\varphi_{second}$ is between 30° and 45°, inclusive. In some embodiments, the second splash angle $\varphi_{second}$ is approximately equal to 38°. Some of the exhaust gas flowing through the upstream plate 300 is propelled against the second splash members 500 which, based on the second splash angle $\varphi_{second}$, cause the exhaust gas to redirected towards the mixing body center axis $C_{body}$. By including additional of the second splash members 500, or by increasing the area of the second splash members 500, the second splash plate 412 could redirect more of the exhaust gas towards the mixing body center axis $C_{body}$. Similarly, by including fewer of the second splash members 500, or by decreasing the area of the second splash members 500, the second splash plate 412 could redirect less of the exhaust gas towards the mixing body center axis $C_{body}$. Additionally, by increasing or decreasing the second splash angle $\varphi_{second}$, the exhaust gas can be redirected closer to the mixing body center axis $C_{body}$ or further from the mixing body center axis $C_{body}$. In various embodiments, the second splash angle $\varphi_{second}$ for all of the second splash members 500 is the same as the first splash angle $\varphi_{first}$ for all of the first splash members 430.

In various embodiments, the second splash plate 412 also includes a plurality of second splash openings 502. In these embodiments, each of the second splash members 500 is contiguous with one of the second splash openings 502. In other embodiments, the second splash plate 412 does not include the second splash openings 502. In these embodiments, the second splash plate 412 may be corrugated and the second splash members 500 may be formed from the corrugations of the second splash plate 412.

Figure 6:
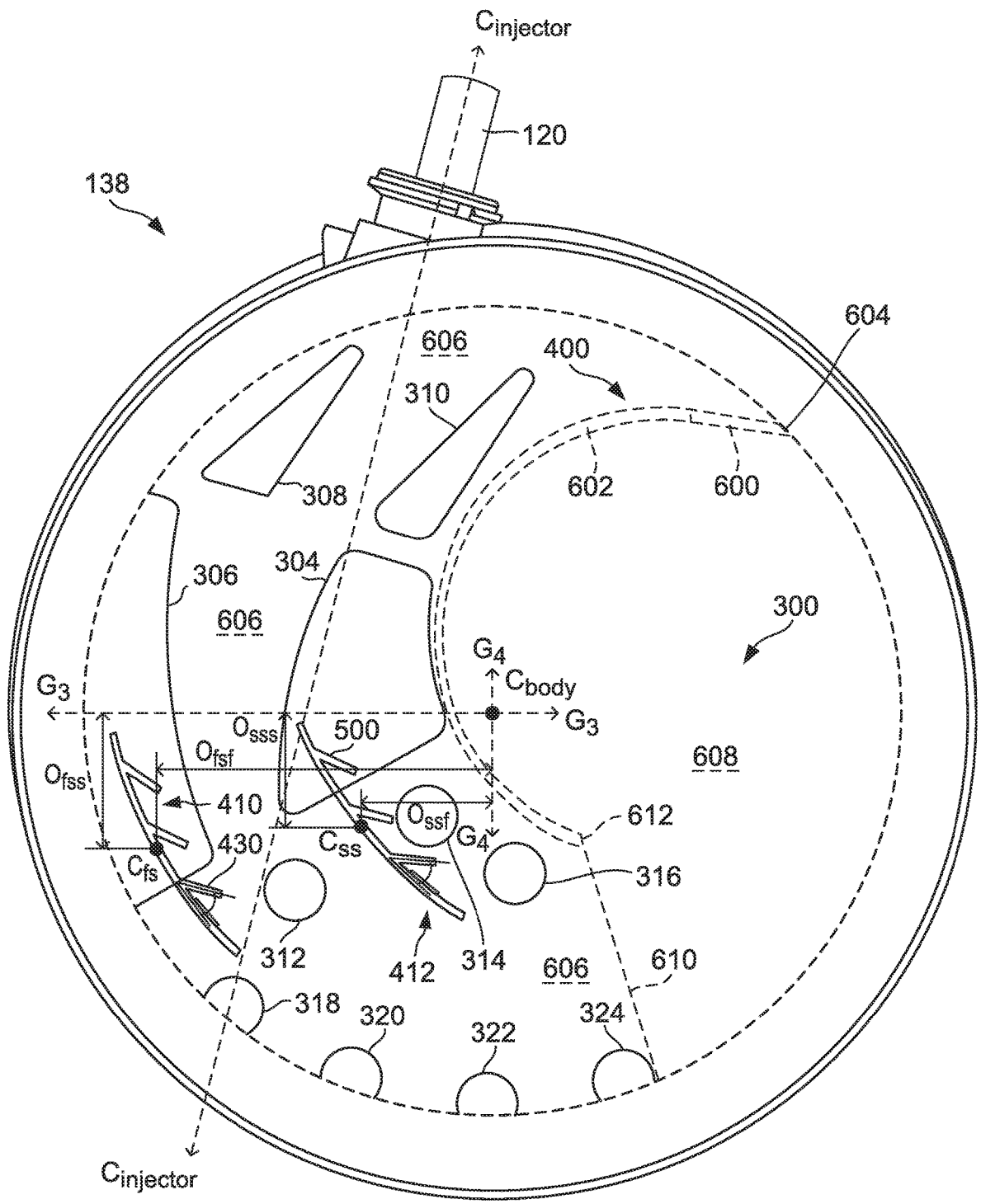
FIG. 6 is a rear side view of the mixing assembly shown in FIG. 2 from a downstream side looking upstream with certain components omitted.

FIG. 6 illustrates the mixing assembly 138 looking from the mixing body downstream coupler 206 and towards the mixing body upstream coupler 202 with the downstream plate 406 hidden.

The first splash plate 410 is centered on a first splash center axis $C_{fs}$ that is parallel to the mixing body center axis $C_{body}$. The first splash center axis $C_{fs}$ is separated from the mixing body center axis $C_{body}$ by a first splash plate first offset $O_{fsf}$ and a first splash plate second offset $O_{fss}$. The first splash plate first offset $O_{fsf}$ is measured along a third reference axis $G_3$. The third reference axis $G_3$ is orthogonal to and coincident with the mixing body center axis $C_{body}$. The first splash plate second offset $O_{fss}$ is measured along a fourth reference axis $G_4$ that is orthogonal to and coincident with the mixing body center axis $C_{body}$ and the third reference axis $G_3$. As shown in FIG. 6, the first splash plate first offset $O_{fsf}$ is larger than the first splash plate second offset $O_{fss}$. In various embodiments, the first splash plate first offset $O_{fsf}$ is between 82 mm and 87 mm, inclusive and the first splash plate second offset $O_{fss}$ is between 29 mm and 36 mm, inclusive.

The second splash plate 412 is centered on a second splash center axis $C_{ss}$ that is parallel to the mixing body center axis $C_{body}$. The second splash center axis $C_{ss}$ is separated from the mixing body center axis $C_{body}$ by a second splash plate first offset $O_{ssf}$ and a second splash plate second offset $O_{sss}$. The second splash plate first offset $O_{ssf}$ is measured along the third reference axis $G_3$. The second splash plate second offset $O_{sss}$ is measured along the fourth reference axis $G_4$. As shown in FIG. 6, the second splash plate first offset $O_{ssf}$ is approximately equal to the second splash plate second offset $O_{sss}$. In various embodiments, the second splash plate first offset $O_{ssf}$ is between 29 mm and 36 mm, inclusive and the second splash plate second offset $O_{sss}$ is between 25 mm and 32 mm, inclusive.

Additionally, the first splash plate 410 has a first splash plate radius of curvature $R_{fb}$ and the second splash plate 412 has a second splash plate radius of curvature $R_{sb}$. The first splash plate radius of curvature $R_{fb}$ and the second splash plate radius of curvature $R_{sb}$ are measured along a plane that is orthogonal to the mixing body center axis $C_{body}$ and along which the third reference axis $G_3$ and the fourth reference axis $G_4$ extend. In various embodiments, the first splash plate radius of curvature $R_{fb}$ is approximately equal to the second splash plate radius of curvature $R_{sb}$. In various embodiments, the first splash plate radius of curvature $R_{fb}$ is between 90 mm and 110 mm, inclusive and the second splash plate radius of curvature $R_{sb}$ is between 90 mm and 110 mm, inclusive. In some embodiments, the first splash plate radius of curvature $R_{fb}$ is approximately equal to 103.3 mm and the second splash plate radius of curvature $R_{sb}$ is approximately equal to 103.3 mm.

The swirl plate 400 includes a swirl plate coupling portion 600 and a swirl plate swirl portion 602. The swirl plate coupling portion 600 has an approximately constant slope with respect to the third reference axis $G_3$. In various embodiments, the swirl plate coupling portion 600 gets further away from the mixing body center axis $C_{body}$ on the fourth reference axis $G_4$ as it gets closer to the mixing body center axis $C_{body}$ on the third reference axis $G_3$.

The swirl plate swirl portion 602 is semi-circular and extends from the swirl plate coupling portion 600 along the third reference axis $G_3$ and past the mixing body center axis $C_{body}$, then extends along the fourth reference axis $G_4$ and past the mixing body center axis $C_{body}$, and then extends along the third reference axis $G_3$ and past the mixing body center axis $C_{body}$ again. This arrangement, as shown in FIG. 6, causes the swirl plate swirl portion 602 to curve around the mixing body center axis $C_{body}$.

The swirl plate swirl portion 602 has a swirl plate radius of curvature $R_{sp}$ that is measured along a plane that is orthogonal to the mixing body center axis $C_{body}$ and along which the third reference axis $G_3$ and the fourth reference $G_4$ extend. The swirl plate radius of curvature $R_{sp}$ is less than the first splash plate radius of curvature $R_{fb}$ and less than the second splash plate radius of curvature $R_{sb}$. In some embodiments, the swirl plate radius of curvature $R_{sp}$ is less than half of the first splash plate radius of curvature $R_{fb}$ and less than half of the second splash plate radius of curvature $R_{sb}$. In various embodiments, the swirl plate radius of curvature $R_{fb}$ is between 40 mm and 65 mm, inclusive. In some embodiments, the swirl plate radius of curvature $R_{fb}$ is approximately equal to 54.8 mm.

The swirl plate coupling portion 600 includes a swirl plate edge 604 that is located adjacent to the mixing body 200. The swirl plate edge 604 is positioned such that the flow of the exhaust gas between the swirl plate edge 604 and the mixing body 200 is prevented or minimized. In some embodiments, the swirl plate edge 604 is coupled to the mixing body 200. For example, the swirl plate edge 604 may be welded to the mixing body 200.

Due to the configuration of the swirl plate edge 604, the prevention or minimization of the flow of the exhaust gas between the swirl plate 400 and the upstream plate 300, and the prevention or minimization of the flow of the exhaust gas between the swirl plate 400 and the downstream plate 406, the swirl plate 400 defines a swirl collection region 606 and a swirl concentration region 608. The swirl collection region 606 and the swirl concentration region 608 extend between the upstream plate 300 and the downstream plate 406 and are separated by the swirl plate 400 and a swirl region boundary 610. The swirl region boundary 610 extends in a straight plane from a leading edge 612 of the swirl plate swirl portion 602 to the mixing body 200 such that each of the first upstream plate opening 304, the second upstream plate opening 306, the third upstream plate opening 308, the fourth upstream plate opening 310, the fifth upstream plate opening 312, the sixth upstream plate opening 314, the seventh upstream plate opening 316, the eighth upstream plate opening 318, the ninth upstream plate opening 320, the tenth upstream plate opening 322, and the eleventh upstream plate opening 324 is contained within the swirl collection region 606 and the volume of the swirl collection region 606 is minimized. As shown in FIG. 6, the swirl region boundary 610 is contiguous with an edge of the eleventh upstream plate opening 324.

The reductant is dosed into the swirl collection region 606 by the injector 120 and along the injector center axis $C_{injector}$. As the reductant is propelled into the swirl collection region 606, the reductant is carried towards the first splash plate 410, the second splash plate 412, and the mixing body 200. Proximate the injector 120, the reductant is surrounded by the exhaust gas so as to cause propulsion of the reductant along with the exhaust gas towards the swirl concentration region 608.

In various embodiments, the mixing assembly 138 is configured such that the injector center axis $C_{injector}$ extends between the third upstream plate opening 308 and the fourth upstream plate opening 310 (e.g., the third upstream plate opening 308 does not extend over the injector center axis $C_{injector}$ and the fourth upstream plate opening 310 does not extend over the injector center axis $C_{injector}$, etc.). In this way, the exhaust gas flows around the reductant being dosed by the injector 120, thereby avoiding propelling the reductant against the downstream plate 406 and instead create a barrier mitigating the formation (e.g., impingement, etc.) or accumulation of reductant deposits on the downstream plate 406. Furthermore, by causing the exhaust gas to flow against the downstream plate 406, the third upstream plate opening 308 and the fourth upstream plate opening 310 function to warm the downstream plate 406 and maintain a temperature of the downstream plate 406 above a threshold. When the temperature of the downstream plate 406 is above the threshold, formation or accumulation of reductant deposits on the downstream plate 406 is further mitigated (e.g., due to evaporation of the reductant upon contacting the downstream plate 406, etc.).

The upstream plate 300 is configured to create a shear flow on the swirl plate 400, the first splash plate 410, the second splash plate 412, and the mixing body 200 so as to prevent or mitigate the formation or accumulation of reductant deposits on the first splash plate 410. In this way, the mixing assembly 138 is capable of desirably mixing the reductant and the exhaust gas for a longer period of time (e.g., between servicing or cleaning of the mixing assembly 138, etc.) than would be possible if the shear flow was not created by the upstream plate 300.

The first upstream plate opening 304 is disposed proximate the swirl plate 400. As the exhaust gas flows through the first upstream plate opening 304, some of the exhaust gas flows across the swirl plate 400 and creates a shear flow on the swirl plate 400. This shear flow propels the reductant away from or off of the swirl plate 400. In this way, the first upstream plate opening 304 may function to mitigate the formation or accumulation of reductant deposits on the swirl plate 400.

The first splash plate 410 is coupled to the upstream plate 300 and the downstream plate 406 so as to extend over the second upstream plate opening 306. As the exhaust gas flows through the second upstream plate opening 306 and into the swirl collection region 606, some of the exhaust gas flows across the first splash plate 410 and creates a shear flow on the first splash plate 410. This shear flow propels the reductant away from or off of the first splash plate 410. In this way, the second upstream plate opening 306 may function to mitigate the formation or accumulation of reductant deposits on the first splash plate 410.

The fifth upstream plate opening 312 is disposed proximate the first splash plate 410 and the second splash plate 412. As the exhaust gas flows through the fifth upstream plate opening 312, some of the exhaust gas flows across the first splash plate 410 and creates a shear flow on the first splash plate 410. This shear flow propels the reductant away from or off of the first splash plate 410. Additionally, some of the exhaust flows across the second splash plate 412 and creates a shear flow on the second splash plate 412. This shear flow propels the reductant away from or off of the second splash plate 412. In this way, the fifth upstream plate opening 312 may function to mitigate the formation or accumulation of reductant deposits on the first splash plate 410 and the second splash plate 412.

The second splash plate 412 is coupled to the upstream plate 300 and the downstream plate 406 so as to extend over the first upstream plate opening 304. As the exhaust gas flows through the first upstream plate opening 304 and into the swirl collection region 606, some of the exhaust gas flows across the second splash plate 412 and creates a shear flow on the second splash plate 412. This shear flow propels the reductant away from or off of the second splash plate 412. In this way, the first upstream plate opening 304 may function to mitigate the formation or accumulation of reductant deposits on the second splash plate 412.

The sixth upstream plate opening 314 and the seventh upstream plate opening 316 are disposed proximate the swirl plate 400 and the second splash plate 412. As the exhaust gas flows through the sixth upstream plate opening 314 and the seventh upstream plate opening 316, some of the exhaust gas flows across the swirl plate 400 and creates a shear flow on the swirl plate 400. This shear flow propels the reductant away from or off of the swirl plate 400. Additionally, some of the exhaust flows across the second splash plate 412 and creates a shear flow on the second splash plate 412. This shear flow propels the reductant away from or off of the second splash plate 412. In this way, the sixth upstream plate opening 314 and the seventh upstream plate opening 316 may function to mitigate the formation or accumulation of reductant deposits on the swirl plate 400 and the second splash plate 412.

The eighth upstream plate opening 318, the ninth upstream plate opening 320, the tenth upstream plate opening 322, and the eleventh upstream plate opening 324 are contiguous with the mixing body 200. As the exhaust gas flows through the eighth upstream plate opening 318, the ninth upstream plate opening 320, the tenth upstream plate opening 322, and the eleventh upstream plate opening 324 and into the swirl collection region 606, some of the exhaust gas flows across the mixing body 200 and creates a shear flow on the mixing body 200. This shear flow propels the reductant away from or off of the mixing body 200 proximate the eighth upstream plate opening 318, the ninth upstream plate opening 320, the tenth upstream plate opening 322, and the eleventh upstream plate opening 324. In this way, the eighth upstream plate opening 318, the ninth upstream plate opening 320, the tenth upstream plate opening 322, and the eleventh upstream plate opening 324 may function to mitigate the formation or accumulation of reductant deposits on the mixing body 200.

The total area of the eighth upstream plate opening 318, the ninth upstream plate opening 320, the tenth upstream plate opening 322, and the eleventh upstream plate opening 324 is relatively small compared to the area of, for example, the first upstream plate opening 304 or the area of the second upstream plate opening 306, because, as described above, the mixing assembly 138 is configured to mitigate the amount of reductant that contacts the mixing body 200. Without the various features described above, such as the swirl plate 400, the first splash plate 410, and the second splash plate 412 or the location of the first upstream plate opening 304, the second upstream plate opening 306, the third upstream plate opening 308, the fourth upstream plate opening 310, the fifth upstream plate opening 312, the sixth upstream plate opening 314, or the seventh upstream plate opening 316, the total area of the eighth upstream plate opening 318, the ninth upstream plate opening 320, the tenth upstream plate opening 322, and the eleventh upstream plate opening 324 may have to be increased in order to mitigate the formation or accumulation of deposits on the mixing body 200.

Figure 7:
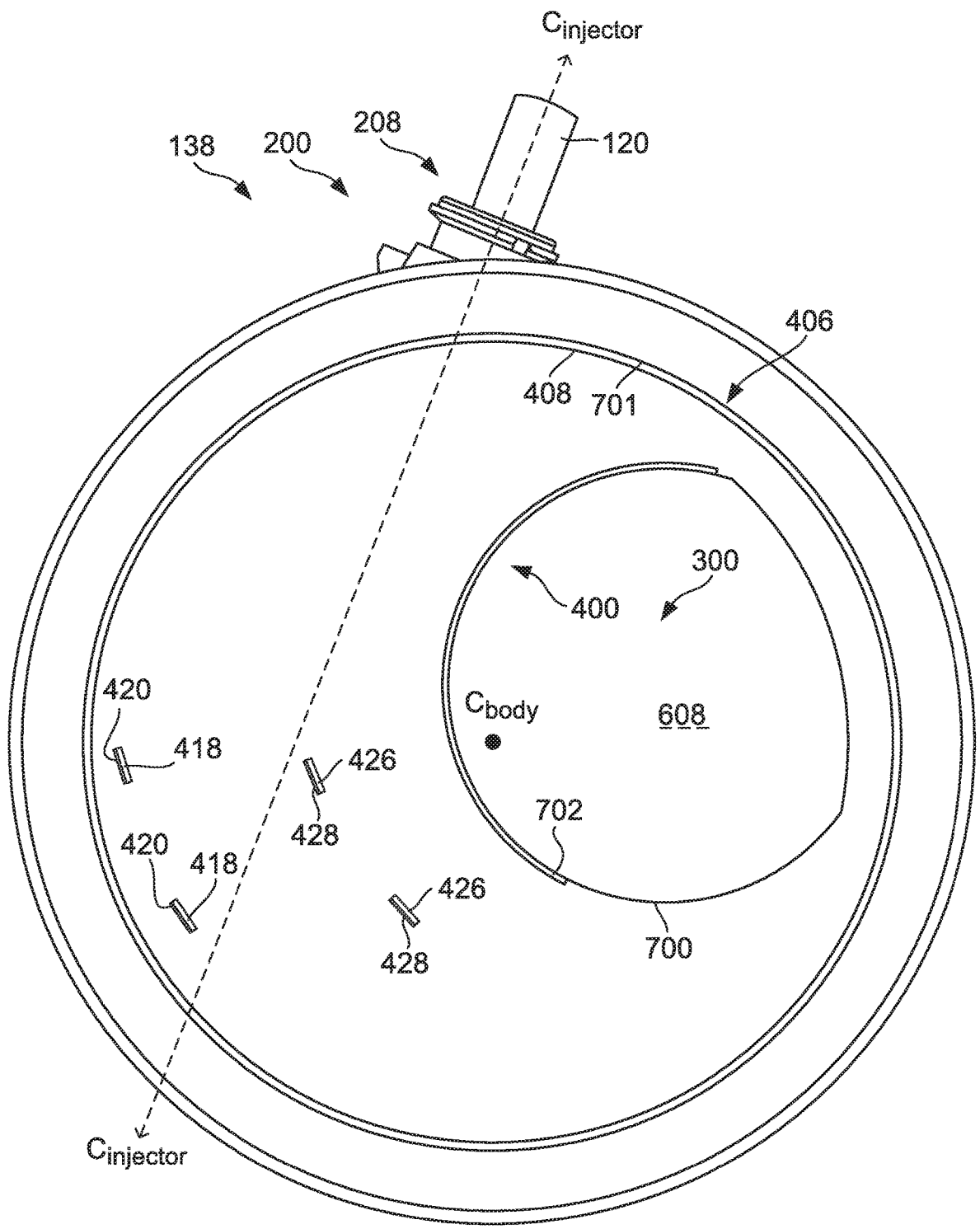
FIG. 7 is a rear side view of the mixing assembly shown in FIG. 2 from a downstream side looking upstream.

FIG. 7 illustrates the mixing assembly 138 looking from the mixing body downstream coupler 206 and towards the mixing body upstream coupler 202. As shown in FIG. 7, the downstream plate 406 includes a downstream plate opening 700 and the downstream plate 406 is coupled to the mixing body 200 across or within a downstream mixing body opening 701 of the mixing body 200. The downstream plate 406 does not include any opening other than the downstream plate opening 700 and the exhaust gas is only able to pass through the downstream plate 406 via the downstream plate opening 700.

The downstream plate opening 700 is positioned around the swirl concentration region 608. After the exhaust gas is provided into the swirl concentration region 608, the velocity of the exhaust gas increases and the exhaust gas flows through the downstream plate opening 700 with the swirl created in the swirl collection region 606 and the swirl concentration region 608.

A downstream swirl plate edge 702 of the swirl plate 400 extends into or through the downstream plate opening 700 and is positioned adjacent the downstream plate 406 such that the flow of the exhaust gas between the swirl plate 400 and the downstream plate 406 is prevented or minimized. In some embodiments, the downstream swirl plate edge 702 is bent over the downstream plate 406 or welded or fastened to the downstream plate 406. In other embodiments, the downstream swirl plate edge 702 is sealed held against the downstream plate 406 via tensile forces within the swirl plate 400 that are created by bending the swirl plate 400.

Due to the configuration of the mixing body 200, upstream plate 300, the swirl plate 400, the first splash plate 410, the second splash plate 412, and the downstream plate 406, the mixing assembly 138 operates with a desirable pressure drop (e.g., a pressure drop that is below a threshold associated with per performance for an exhaust aftertreatment system, etc.) when comparing a pressure upstream of the mixing assembly 138 and a pressure downstream of the mixing assembly 138. Additionally, the configuration of the mixing body 200, upstream plate 300, the swirl plate 400, the first splash plate 410, the second splash plate 412, and the downstream plate 406 provides a desirable flow distribution index (FDI) at an upstream face of the SCR catalyst 110.

Figure 8:
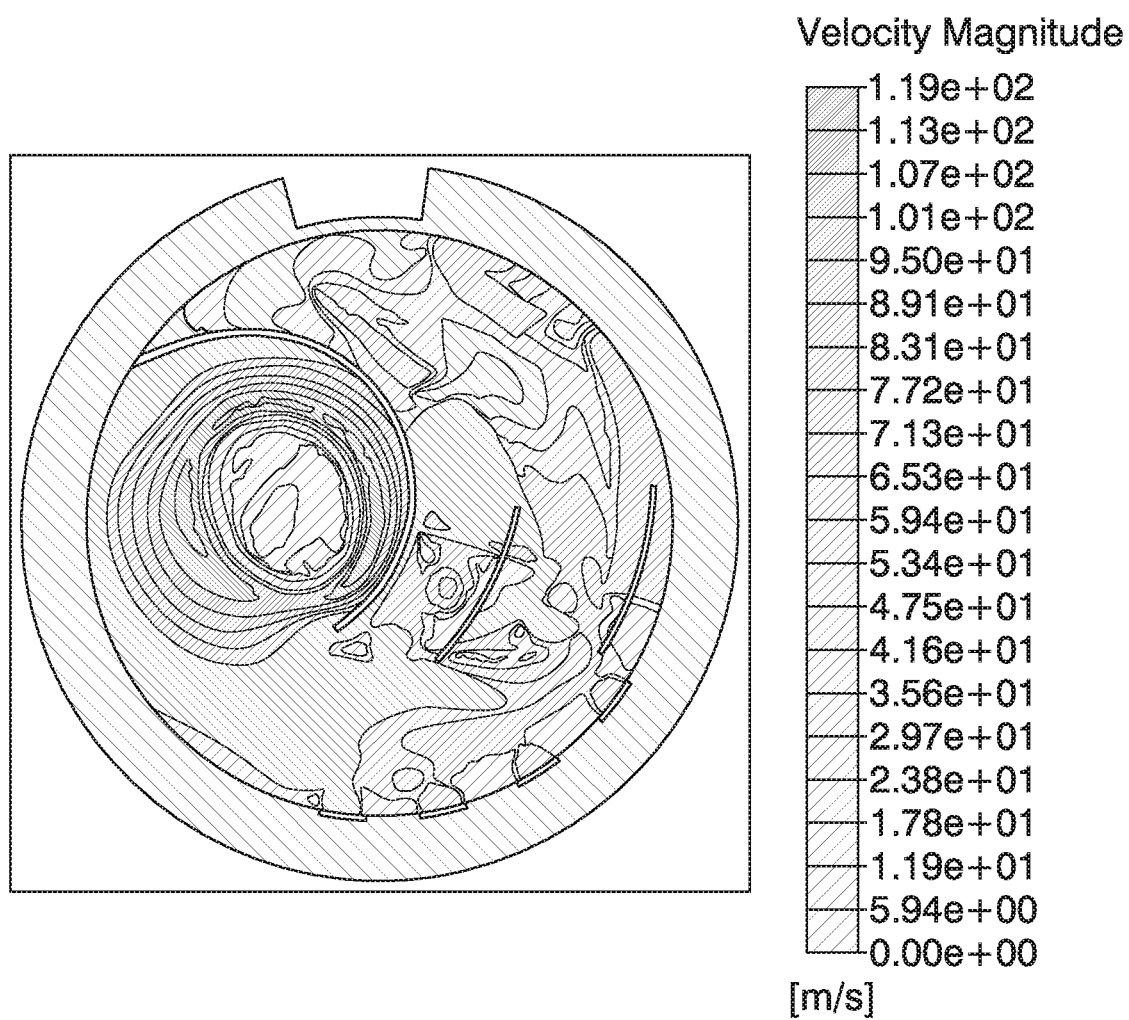
FIGS. 8-10 are images of velocity magnitudes within the mixing assembly shown in FIG. 2.
Figure 9:
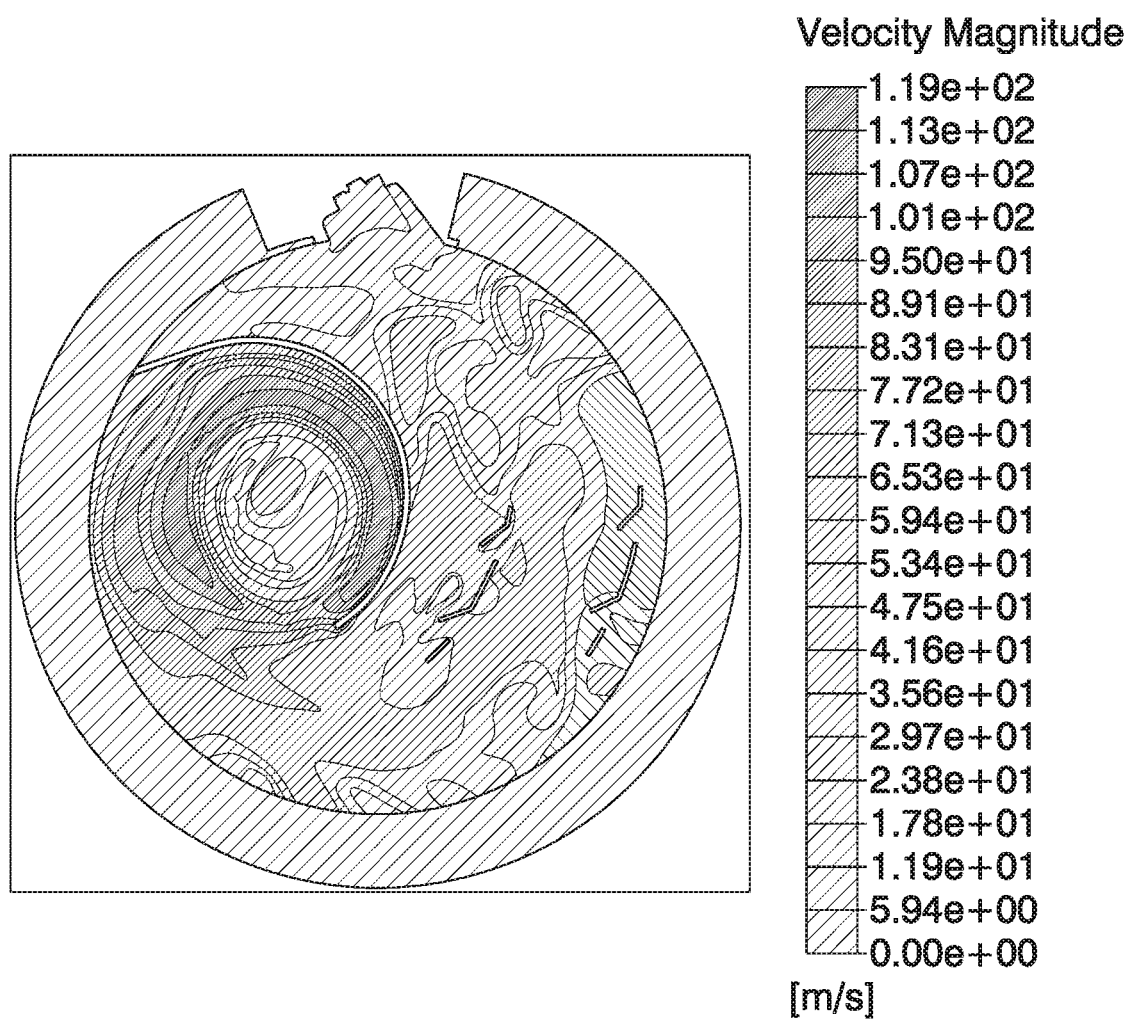
Figure 10:
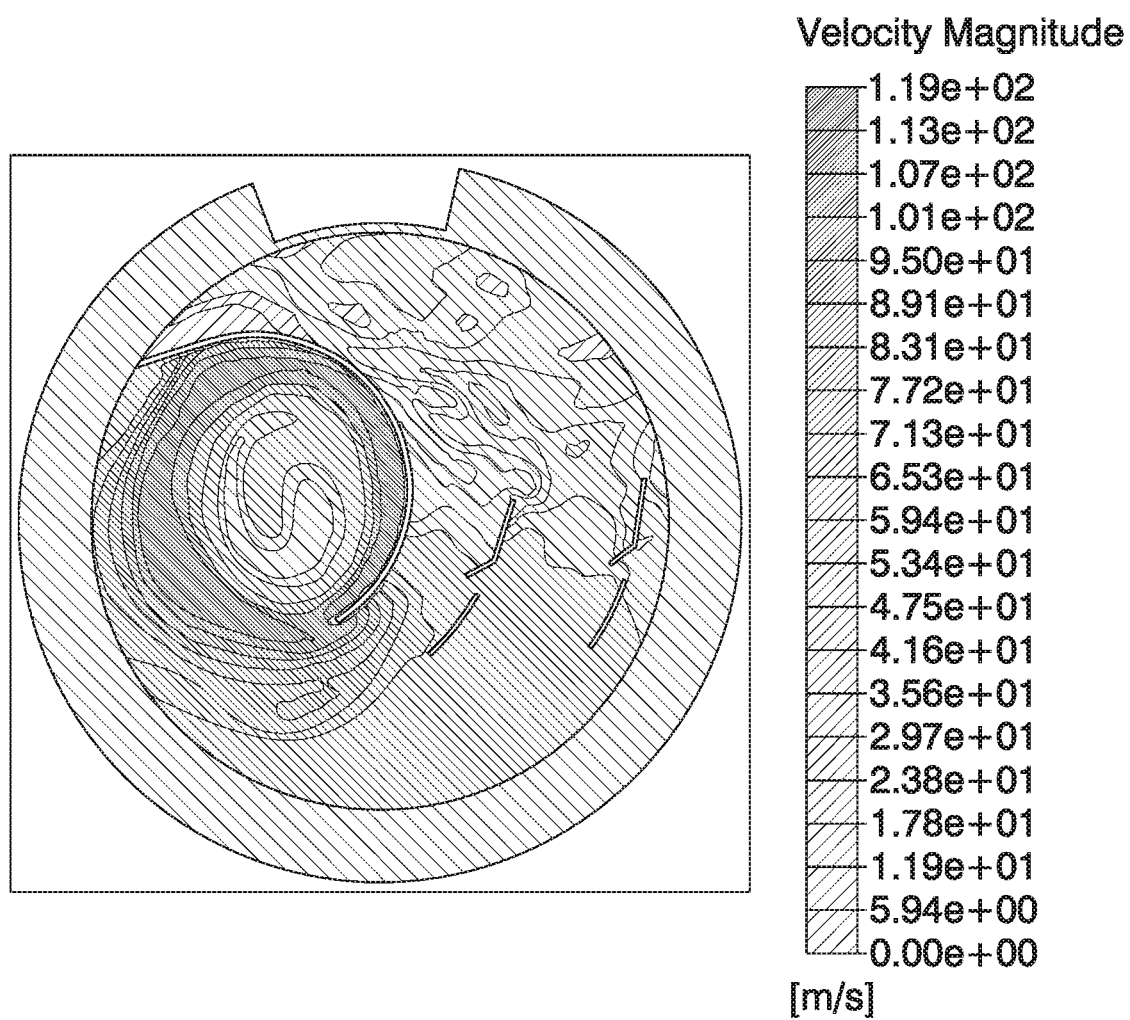

FIGS. 8-10 illustrate velocity magnitudes of the exhaust gas flowing through the mixing assembly 138, according to various embodiments. Viewed in sequence, FIG. 8, FIG. 9, and FIG. 10, illustrate the velocity magnitudes of the exhaust gas from a first location just downstream of the upstream plate 300 (FIG. 8) to a third location just upstream of the downstream plate 406 (FIG. 10), and a second location therebetween (FIG. 9).

As shown in FIGS. 8-10, a flow of the exhaust gas enters the swirl collection region 606 through the upstream plate 300. This creates localized regions with relatively high velocity magnitudes in the swirl collection region 606 proximate the first upstream plate opening 304, the second upstream plate opening 306, the third upstream plate opening 308, the fourth upstream plate opening 310, the fifth upstream plate opening 312, the sixth upstream plate opening 314, the seventh upstream plate opening 316, the eighth upstream plate opening 318, the ninth upstream plate opening 320, the tenth upstream plate opening 322, and the eleventh upstream plate opening 324. These localized regions are most prominent near the upstream plate (FIG. 8) and least prominent farthest away from the upstream plate (FIG. 10).

The mixing body 200, the swirl plate 400, the first splash plate 410, and the second splash plate 412 cooperate to redirect the exhaust gas and cause the exhaust gas to be spun out of the swirl collection region 606 towards the swirl concentration region 608. As the exhaust gas approaches the swirl region boundary 610, the velocity of the exhaust gas gradually increases. Once in the swirl concentration region 608, the velocity of the exhaust gas rapidly increases as the exhaust gas swirls along the mixing body 200, along the swirl plate 400, and out of the downstream plate opening 700. Through this swirl, the reductant provided by the injector 120 is effectively mixed with the exhaust gas.

By varying the first splash plate first offset $O_{fsf}$, the first splash plate second offset $O_{fss}$, the second splash plate first offset $O_{ssf}$, the second splash plate second offset $O_{sss}$, the first splash plate radius of curvature $R_{fb}$, and the second splash plate radius of curvature $R_{sb}$, the first splash plate 410 and the second splash plate 412 can be positioned within the mixing body 200 such that the swirl created by the swirl plate 400 is enhanced (e.g., tightened, concentrated, etc.).

When an application for the mixing assembly 138 is determined, a model of the mixing assembly 138 can be uploaded into a computational fluid dynamics (CFD) solution such as ANSYS Fluent or SOLIDWORKS® Flow Simulation and variables such as the number of first splash members 430, the number of the first splash openings 432, the first splash angle $\varphi_{first}$, the first splash plate first offset $O_{fsf}$, the first splash plate second offset $O_{fss}$, the second splash plate first offset $O_{ssf}$, the second splash plate second offset $O_{sss}$, the first splash plate radius of curvature $R_{fb}$, and the second splash plate radius of curvature $R_{sb}$ can be optimized to provide a target swirl of the exhaust gas between the upstream plate 300 and the downstream plate 406 which is associated with a target dispersal (e.g., uniformity index, etc.) of the reductant in the exhaust gas.

Figure 11:
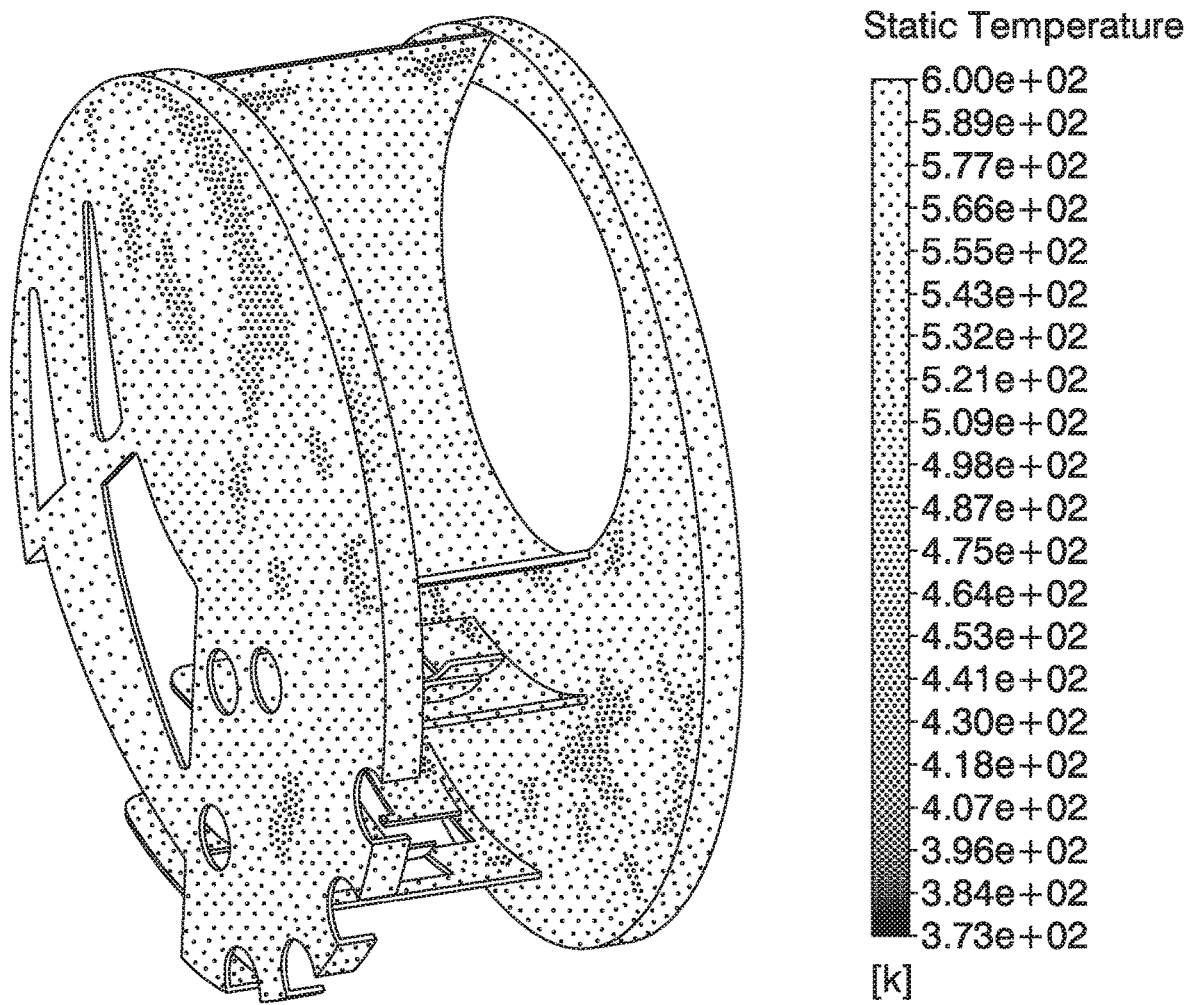
FIGS. 11 and 12 are images of temperature gradient within the mixing assembly shown in FIG. 2.
Figure 12:
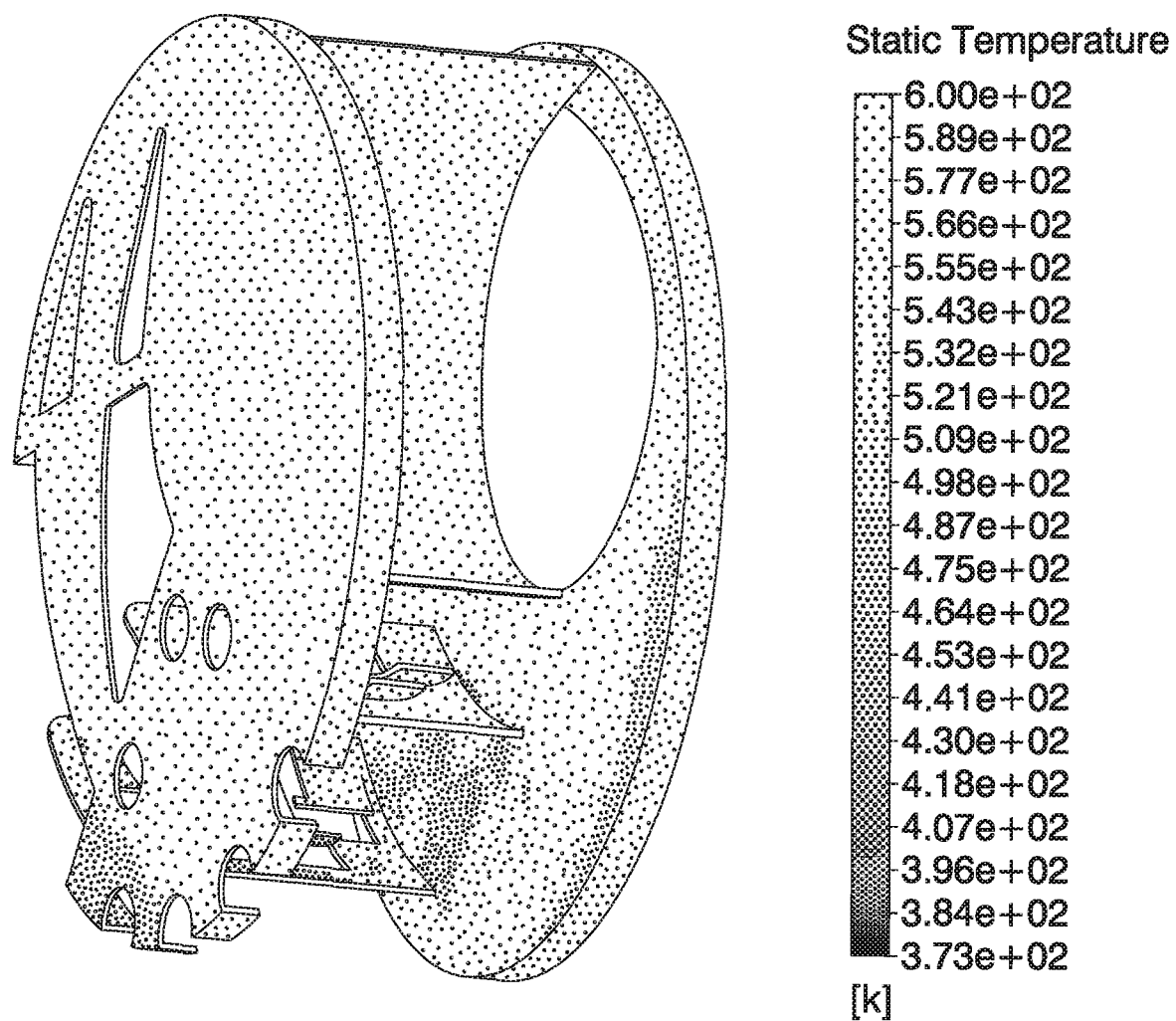

FIGS. 11 and 12 show temperature gradients within the mixing assembly 138, according to various embodiments. FIG. 11 illustrates the temperature gradients within the mixing assembly 138 prior to the injector 120 dosing the reductant into the mixing assembly 138 and FIG. 12 illustrates the temperature gradients within the mixing assembly 138 after the injector 120 has dosed the reductant into the mixing assembly 138.

FIG. 12 shows localized areas that are of relatively lower temperature. These areas are locations where the reductant is most prevalent. Without the configuration of the mixing assembly 138 described herein, reductant deposits may form or accumulate in such areas. However, the mixing assembly 138 is configured such that locations where reductant is prevalent are both heated (e.g., by the eighth upstream plate opening 318, the ninth upstream plate opening 320, the tenth upstream plate opening 322, and the eleventh upstream plate opening 324, etc.) and provided with a shear flow. In these ways, the formation or accumulation of reductant deposits within the mixing assembly 138 is mitigated.

It is understood that additional injector mounts 208 could be included in the mixing assembly 138 such that additional injectors 120 could be used with the mixing assembly 138.

IV. Construction of Example Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "generally," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The terms "fluidly coupled to" and the like, as used herein, mean the two components or objects have a pathway formed between the two components or objects in which a fluid, such as air, exhaust gas, liquid reductant, gaseous reductant, aqueous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the application, the scope being defined by the claims that follow. When the language "a portion" is used, the item can include a portion and/or the entire item unless specifically stated to the contrary.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Additionally, the use of ranges of values (e.g., W to P, etc.) herein are inclusive of their maximum values and minimum values (e.g., W to P includes W and includes P, etc.), unless otherwise indicated. Furthermore, a range of values (e.g., W to P, etc.) does not necessarily require the inclusion of intermediate values within the range of values (e.g., W to P can include only W and P, etc.), unless otherwise indicated.

What is claimed is:

1. A mixing assembly for an exhaust aftertreatment system, the mixing assembly comprising:
    a mixing body comprising an upstream mixing body opening and a downstream mixing body opening, the upstream mixing body opening configured to receive exhaust gas;
    an upstream plate coupled to the mixing body, the upstream plate comprising a plurality of upstream plate openings, each of the plurality of upstream plate openings configured to receive a flow percentage that is less than 50% of a total flow of the exhaust gas;
    a downstream plate coupled to the mixing body downstream from the upstream plate in a direction of exhaust gas flow, the downstream plate comprising a downstream plate opening; and
    a swirl plate positioned between the upstream plate and the downstream plate and defining a swirl collection region and a swirl concentration region contiguous with the swirl collection region, the swirl collection region positioned over the plurality of upstream plate openings and the swirl collection region positioned over the downstream plate opening;
    wherein the plurality of upstream plate openings comprises:
        a first upstream plate opening that is configured to receive a first flow percentage that is less than 40% of the total flow of the exhaust gas;
        a second upstream plate opening that is configured to receive a second flow percentage that is less than 35% of the total flow of the exhaust gas;
        a third upstream plate opening that is configured to receive a third flow percentage that is less than 10% of the total flow of the exhaust gas; and
        a fourth upstream plate opening that is configured to receive a fourth flow percentage that is less than 10% of the total flow of the exhaust gas.

2. The mixing assembly of claim 1, wherein the plurality of upstream plate openings further comprises a fifth upstream plate opening that is configured to receive a fifth flow percentage that is less than 5% of the total flow of the exhaust gas.

3. The mixing assembly of claim 1, further comprising:
    a first splash plate positioned between the upstream plate and the downstream plate and located in the swirl collection region, the first splash plate comprising a plurality of first splash plate openings; and
    a second splash plate positioned between the upstream plate and the downstream plate and located in the swirl collection region, the second splash plate comprising a plurality of second splash plate openings.

4. The mixing assembly of claim 3, further comprising an injector mount coupled to the mixing body and configured to be coupled to an injector such that an injector center axis of the injector extends into the swirl collection region;
    wherein the first splash plate is coupled to the upstream plate and the downstream plate;
    wherein the second splash plate is coupled to the upstream plate and the downstream plate; and
    wherein the injector center axis extends between the first splash plate and the second splash plate.

5. The mixing assembly of claim 4, wherein the injector center axis intersects at least one of the first splash plate or the second splash plate.

6. The mixing assembly of claim 1, further comprising an injector mount coupled to the mixing body and configured to be coupled to an injector such that an injector center axis of the injector extends into the swirl collection region;
  wherein the first flow percentage is greater than or equal to 20% of the total flow of the exhaust gas;
  wherein the second flow percentage is greater than or equal to 20% of the total flow of the exhaust gas;
  wherein the second flow percentage is less than the first flow percentage; and
  wherein the injector center axis extends between the first upstream plate opening and the second upstream plate opening.

7. The mixing assembly of claim 6, wherein:
  the third flow percentage is greater than or equal to 4%;
  the fourth flow percentage is greater than or equal to 4% of the total flow of the exhaust gas;
  the third flow percentage is less than the second flow percentage; and
  the fourth flow percentage is less than the third flow percentage.

8. The mixing assembly of claim 7, wherein the injector center axis extends between the third upstream plate opening and the fourth upstream plate opening.

9. The mixing assembly of claim 1, further comprising an injector mount coupled to the mixing body and configured to be coupled to an injector such that an injector center axis of the injector extends into the swirl collection region;
  wherein the injector center axis does not intersect the swirl plate.

10. The mixing assembly of claim 9, wherein:
  the mixing body is centered on a mixing body center axis; and
  the injector mount is configured such that the injector center axis is orthogonal to the mixing body center axis.

11. A mixing assembly comprising:
  a mixing body comprising an upstream mixing body opening and a downstream mixing body opening, the upstream mixing body opening configured to receive exhaust gas;
  an upstream plate coupled to the mixing body, the upstream plate comprising:
    a first upstream plate opening that is configured to receive a first flow percentage that is between 20% and 40%, inclusive of a total flow of the exhaust gas; and
    a second upstream plate opening that is configured to receive a second flow percentage that is between 20% and 40%, inclusive of the total flow of the exhaust gas; and
  an injector mount coupled to the mixing body and configured to be coupled to an injector, the injector mount defined by an injector center axis that extends between the first upstream plate opening and the second upstream plate opening.

12. The mixing assembly of claim 11, wherein:
  the upstream plate further comprises a third upstream plate opening that is configured to receive a third flow percentage that is between 0.28% and 12%, inclusive of the total flow of the exhaust gas;
  the third upstream plate opening is formed between the mixing body and the upstream plate; and
  the injector center axis extends between the third upstream plate opening and the second upstream plate opening.

13. The mixing assembly of claim 11, further comprising:
  a downstream plate coupled to the mixing body downstream from the upstream plate in a direction of exhaust gas flow, the downstream plate comprising a downstream plate opening; and
  a swirl plate positioned between the upstream plate and the downstream plate and defining a swirl collection region and a swirl concentration region contiguous with the swirl collection region, the swirl collection region extending across the first upstream plate opening and the second upstream plate opening and the swirl collection region extending across the downstream plate opening.

14. The mixing assembly of claim 13, wherein:
  the mixing body is centered on a mixing body center axis;
  the swirl plate extends between the mixing body center axis and the first upstream plate opening; and
  the swirl plate extends between the mixing body center axis and the second upstream plate opening.

15. The mixing assembly of claim 11, wherein the second upstream plate opening is contiguous with the mixing body.

16. A mixing assembly comprising:
  a mixing body comprising an upstream mixing body opening and a downstream mixing body opening, the upstream mixing body opening configured to receive exhaust gas;
  an upstream plate coupled to the mixing body, the upstream plate comprising:
    a first upstream plate opening that is configured to receive a first flow percentage that is between 20% and 40%, inclusive of a total flow of the exhaust gas; and
    a second upstream plate opening that is configured to receive a second flow percentage that is between 20% and 40%, inclusive of the total flow of the exhaust gas; and
  a swirl plate coupled to the upstream plate and defining a swirl collection region and a swirl concentration region contiguous with the swirl collection region, the swirl collection region extending across the first upstream plate opening and the second upstream plate opening and the swirl collection region separated from the first upstream plate opening and the second upstream plate opening by the swirl plate.

17. The mixing assembly of claim 16, further comprising:
  a first splash plate coupled to the upstream plate and located in the swirl collection region, the first splash plate comprising:
    a plurality of first splash members; and
    a plurality of first splash plate openings, each of the plurality of first splash plate openings contiguous with one of the plurality of first splash members; and
  a second splash plate coupled to the upstream plate and located in the swirl collection region, the second splash plate comprising:
    a plurality of second splash members; and
    a plurality of second splash plate openings, each of the plurality of second splash plate openings contiguous with one of the plurality of second splash members.

18. The mixing assembly of claim 17, wherein:
  the mixing body is centered on a mixing body center axis;
  the swirl plate extends between the mixing body center axis and the first splash plate; and
  the swirl plate extends between the mixing body center axis and the second splash plate.

19. The mixing assembly of claim 18, wherein:
the upstream plate is disposed along a plane; and
the mixing body center axis is orthogonal to the plane.

20. A mixing assembly for an exhaust aftertreatment system, the mixing assembly comprising:
- a mixing body comprising an upstream mixing body opening and a downstream mixing body opening, the upstream mixing body opening configured to receive exhaust gas;
- an upstream plate coupled to the mixing body, the upstream plate comprising a plurality of upstream plate openings, each of the plurality of upstream plate openings configured to receive a flow percentage that is less than 50% of a total flow of the exhaust gas;
- a downstream plate coupled to the mixing body downstream from the upstream plate in a direction of exhaust gas flow, the downstream plate comprising a downstream plate opening;
- a swirl plate positioned between the upstream plate and the downstream plate and defining a swirl collection region and a swirl concentration region contiguous with the swirl collection region, the swirl collection region positioned over the plurality of upstream plate openings and the swirl collection region positioned over the downstream plate opening;
- a first splash plate positioned between the upstream plate and the downstream plate and located in the swirl collection region, the first splash plate comprising a plurality of first splash plate openings; and
- a second splash plate positioned between the upstream plate and the downstream plate and located in the swirl collection region, the second splash plate comprising a plurality of second splash plate openings.

21. The mixing assembly of claim 20, further comprising an injector mount coupled to the mixing body and configured to be coupled to an injector such that an injector center axis of the injector extends into the swirl collection region;
wherein the first splash plate is coupled to the upstream plate and the downstream plate;
wherein the second splash plate is coupled to the upstream plate and the downstream plate; and
wherein the injector center axis extends between the first splash plate and the second splash plate.

22. The mixing assembly of claim 21, wherein the injector center axis intersects at least one of the first splash plate or the second splash plate.

23. A mixing assembly for an exhaust aftertreatment system, the mixing assembly comprising:
- a mixing body comprising an upstream mixing body opening and a downstream mixing body opening, the upstream mixing body opening configured to receive exhaust gas;
- an upstream plate coupled to the mixing body, the upstream plate comprising a plurality of upstream plate openings, each of the plurality of upstream plate openings configured to receive a flow percentage that is less than 50% of a total flow of the exhaust gas;
- a downstream plate coupled to the mixing body downstream from the upstream plate in a direction of exhaust gas flow, the downstream plate comprising a downstream plate opening;
- a swirl plate positioned between the upstream plate and the downstream plate and defining a swirl collection region and a swirl concentration region contiguous with the swirl collection region, the swirl collection region positioned over the plurality of upstream plate openings and the swirl collection region positioned over the downstream plate opening; and
- an injector mount coupled to the mixing body and configured to be coupled to an injector such that an injector center axis of the injector extends into the swirl collection region;

wherein the plurality of upstream plate openings comprises:
- a first upstream plate opening that is configured to receive a first flow percentage that is between 20% and 40%, inclusive of the total flow of the exhaust gas; and
- a second upstream plate opening that is configured to receive a second flow percentage that is between 20% and 40%, inclusive of the total flow of the exhaust gas;

wherein the second flow percentage is less than the first flow percentage; and
wherein the injector center axis extends between the first upstream plate opening and the second upstream plate opening.

24. The mixing assembly of claim 23, wherein:
the plurality of upstream plate openings further comprises:
- a third upstream plate opening that is configured to receive a third flow percentage that is between 4% and 20%, inclusive of the total flow of the exhaust gas; and
- a fourth upstream plate opening that is configured to receive a fourth flow percentage that is between 4% and 15%, inclusive of the total flow of the exhaust gas;

the third flow percentage is less than the second flow percentage; and
the fourth flow percentage is less than the third flow percentage.

25. The mixing assembly of claim 24, wherein the injector center axis extends between the third upstream plate opening and the fourth upstream plate opening.

* * * * *